United States Patent
Yeh

(10) Patent No.: US 11,065,837 B2
(45) Date of Patent: Jul. 20, 2021

(54) FOAM PRODUCT

(71) Applicant: AGIT Global IP Holdings, LLC, Irvine, CA (US)

(72) Inventor: Tzong In Yeh, Fremont, CA (US)

(73) Assignee: AGIT GLOBAL IP HOLDINGS, LLC, Irvine, CA (US)

( * ) Notice: Subject to any disclaimer, the term of this patent is extended or adjusted under 35 U.S.C. 154(b) by 44 days.

(21) Appl. No.: 16/547,028

(22) Filed: Aug. 21, 2019

(65) Prior Publication Data

US 2019/0375189 A1   Dec. 12, 2019

Related U.S. Application Data

(60) Division of application No. 15/819,934, filed on Nov. 21, 2017, now Pat. No. 10,464,288, which is a
(Continued)

(51) Int. Cl.
| | |
|---|---|
| *A63C 5/03* | (2006.01) |
| *B32B 5/32* | (2006.01) |
| *A63C 5/00* | (2006.01) |
| *B32B 5/18* | (2006.01) |
| *B32B 27/06* | (2006.01) |
| *B32B 27/32* | (2006.01) |
| *B32B 27/30* | (2006.01) |
| *B32B 27/08* | (2006.01) |

(Continued)

(52) U.S. Cl.
CPC ............. *B32B 5/32* (2013.01); *A63C 5/003* (2013.01); *A63C 5/03* (2013.01); *B32B 5/18* (2013.01); *B32B 27/065* (2013.01); *B32B 27/08* (2013.01); *B32B 27/308* (2013.01); *B32B 27/32* (2013.01); *B63B 32/57* (2020.02); *B63B 32/80* (2020.02); *B63B 34/20* (2020.02); *A63C 5/126* (2013.01); *B32B 2266/025* (2013.01); *B32B 2266/0228* (2013.01); *B63B 2035/009* (2013.01); *B63B 2231/50* (2013.01)

(58) Field of Classification Search
CPC ........... A63C 5/03; A63C 5/003; A63C 5/126; A63C 5/00; B63B 5/18; B63B 34/20; B63B 32/57; B63B 32/80; B63B 5/32; B63B 27/065; B63B 27/308; B63B 27/08; B63B 27/32; B32B 27/065; B32B 27/308; B32B 27/08; B32B 27/32; B32B 5/32; B32B 5/18
See application file for complete search history.

(56) References Cited

U.S. PATENT DOCUMENTS 3,338,203 A   8/1967   Moore
3,478,134 A   11/1969   Gruss et al.
(Continued)

*Primary Examiner* — Stephen P Avila
(74) *Attorney, Agent, or Firm* — Muncy, Geissler, Olds & Lowe, P.C.

(57) ABSTRACT

A foam product includes a foam core, a soft skin covering the foam core, and a base structure on which the foam core is disposed. The foam core of expanded beads has an outer surface on which some outermost beads of the expanded beads are exposed and bulging outward with different heights to form a bubbly texture. The foam skin has an inner surface attached to the outer surface of the foam core, and has at its inner surface a plurality of concave cavities each matedly surrounding a respective one of the bulging, outermost beads on the outer surface of the foam core.

18 Claims, 23 Drawing Sheets

Related U.S. Application Data continuation-in-part of application No. 15/249,902, filed on Aug. 29, 2016, now Pat. No. 9,855,997.

(51) Int. Cl.
  *B63B 32/57*   (2020.01)
  *B63B 32/80*   (2020.01)
  *B63B 34/20*   (2020.01)
  B63B 35/00    (2020.01)
  A63C 5/12     (2006.01)

(56) References Cited

U.S. PATENT DOCUMENTS

| | | |
|---|---|---|
| 3,707,401 A | 12/1972 | Jarema et al. |
| 3,839,080 A | 10/1974 | Jarema et al. |
| 9,120,218 B1 | 9/2015 | Stehlik |
| 9,676,458 B2 * | 6/2017 | VanNimwegen ....... B63B 32/80 |
| 9,855,997 B1 | 1/2018 | Yeh |
| 2004/0149197 A1 | 8/2004 | Maklezow |
| 2007/0155261 A1 | 7/2007 | Cheung |
| 2007/0264891 A1 * | 11/2007 | Cheung ................... A63C 5/03 441/74 |
| 2008/0032575 A1 | 2/2008 | Wyrsta et al. |
| 2010/0084080 A1 * | 4/2010 | Cheung ................ B29C 48/154 156/213 |
| 2011/0097569 A1 * | 4/2011 | Yeh ......................... B29C 67/04 428/309.9 |
| 2013/0115399 A1 | 5/2013 | Roberts |
| 2013/0257069 A1 | 10/2013 | Roberts |
| 2013/0260080 A1 | 10/2013 | Roberts |
| 2014/0315453 A1 | 10/2014 | Brouwer et al. |
| 2015/0064379 A1 | 3/2015 | Roberts |
| 2015/0118426 A1 | 4/2015 | Roberts |
| 2015/0196809 A1 | 7/2015 | Sullivan et al. |

* cited by examiner

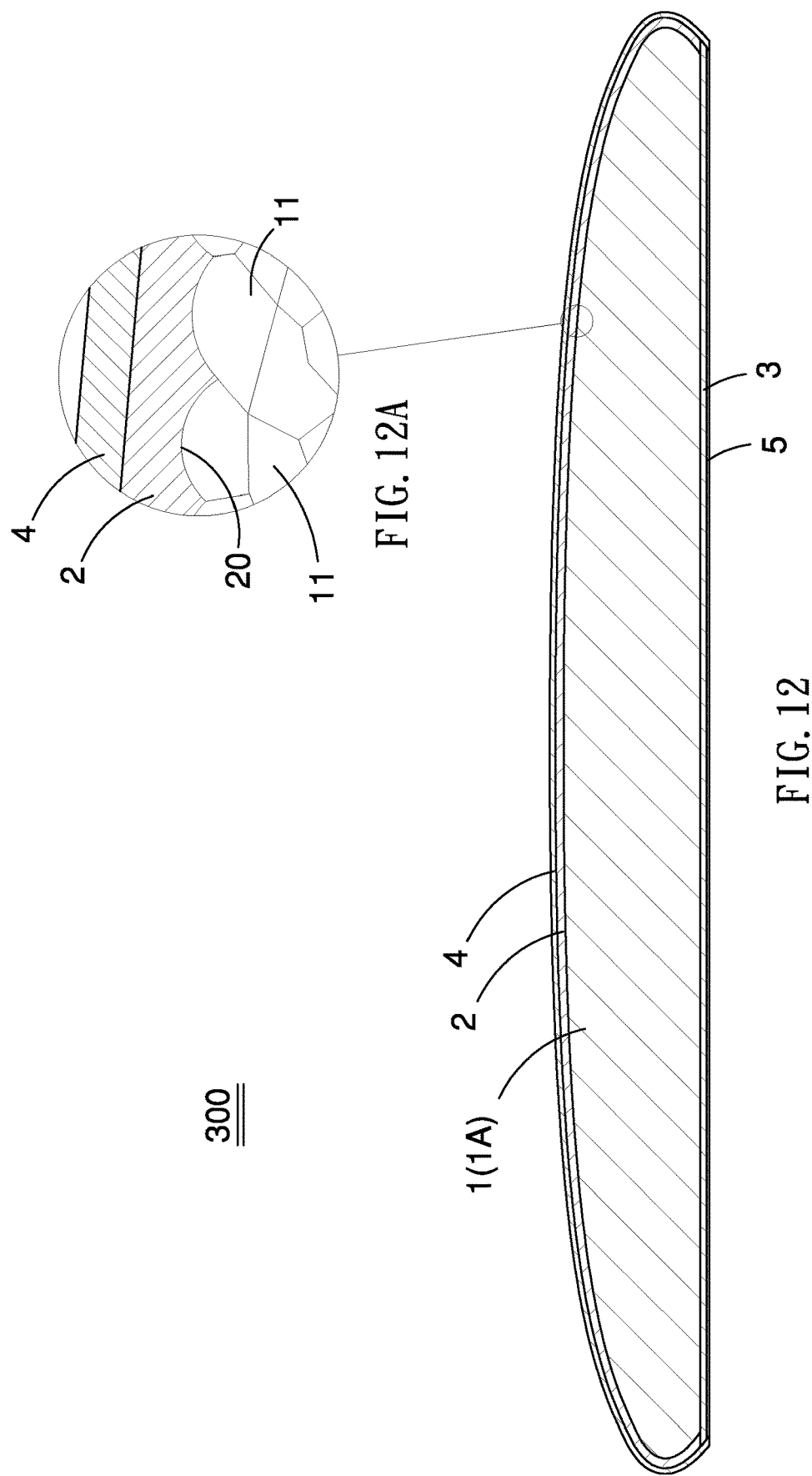

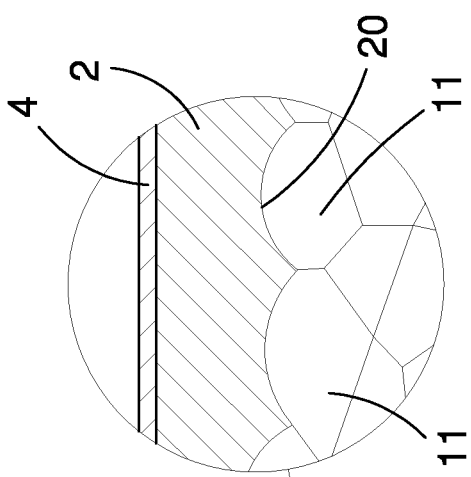
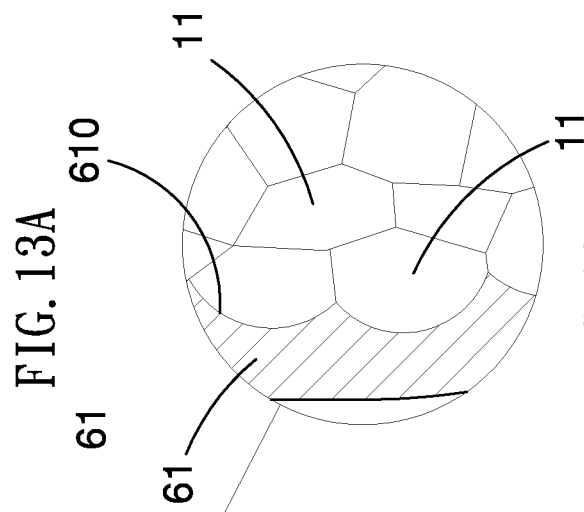
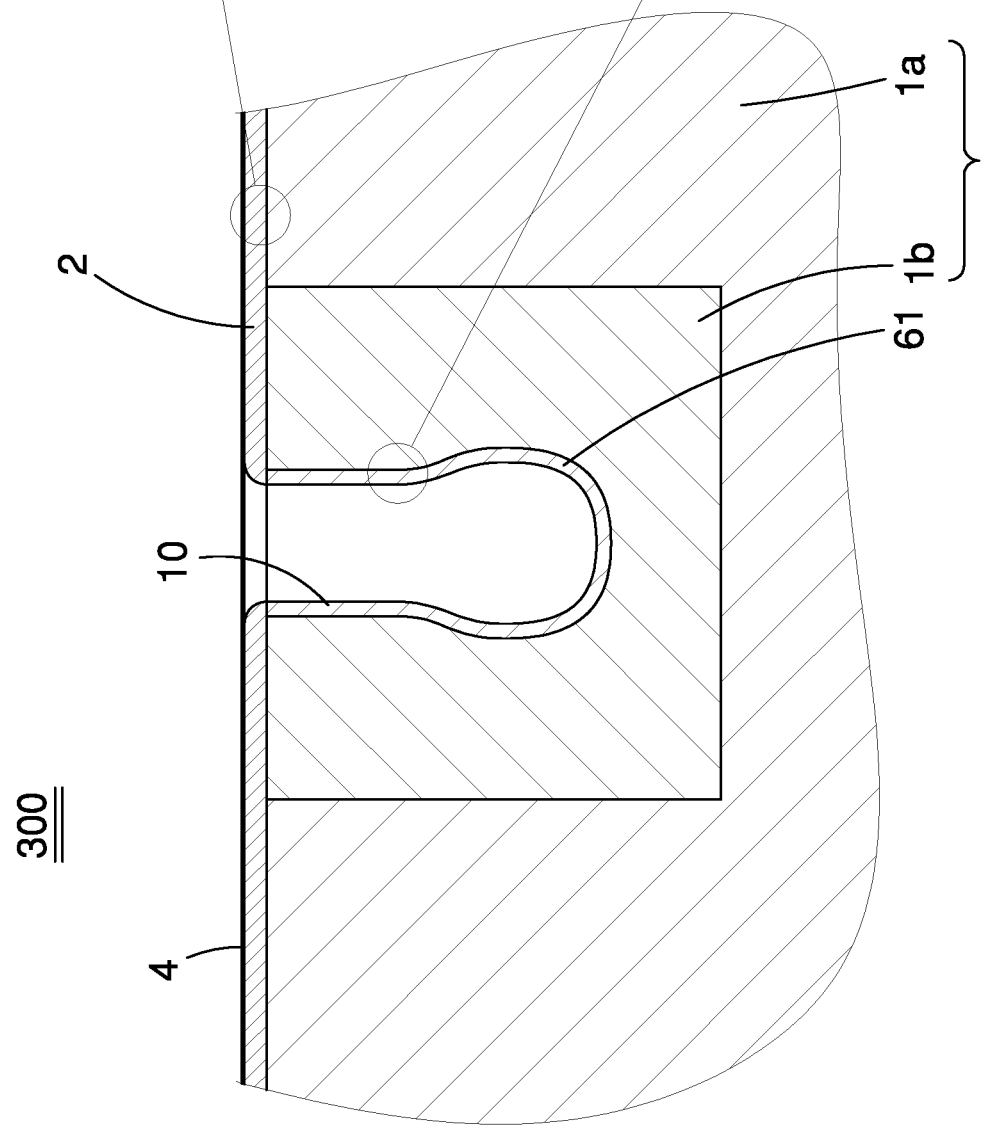
FIG. 13A
FIG. 13B
FIG. 13

FOAM PRODUCT

CROSS-REFERENCE TO RELATED APPLICATION

This is a divisional application of co-pending application Ser. No. 15/819,934, filed on Nov. 21, 2017.

BACKGROUND OF THE INVENTION

1. Field of the Invention

The present invention relates to a foam product, and more particularly to a closed-cell foam product.

2. Description of the Related Art

Nowadays, if a foam product is too wide to be carried under the arm, such as a standup paddle board, it may employ a recessed grip handle structure so that a user may have the fingers of a hand be inserted into the grip handle structure to carry the paddle board under the arm.

One type of standup paddle board is illustrated in U.S. Pat. No. 9,120,218. In this paddle board, the grip handle structure is constructed from a rigid plastic material, such as Nylon™ fiber and installed flush into the deck of the paddle board at the center of gravity of the board to provide the proper balance when the board is carried using the grip handle. More specifically, the grip handle structure is glued to the foam core of the paddle board using an epoxy resin glue.

Another type of standup paddle board is illustrated in U.S. Patent Pub. No. 2014/0315453. In this paddle board, a recess is defined in a top surface of the foam core of the paddle board, and an upper foam skin covers the top surface of the foam core. In particular, a portion of the upper foam skin extends along the profile of the recess in the foam core to form a grip handle structure for carrying the paddle board.

SUMMARY OF THE INVENTION

This invention provides a new foam product with a different structure as compared to the conventional foam product.

Specifically, the foam product generally includes a foam product comprising a foam core defining in its top surface a recess, the recess having an inner wall; and a soft shell disposed within the recess of the foam core and having an outer wall attached to the inner wall of the recess, wherein the soft shell has a space configured in size to receive at least one finger of a human hand.

Preferred embodiments of the invention may have the following additional characteristics, either alone or in combination:

The soft shell is made of a cross-linked polyethylene foam, wherein the cross-linked polyethylene foam is an irradiated cross-linked polyethylene foam. Preferably, the soft shell has a thickness of 2 mm to 3 mm. Morever, the space of the soft shell has an upper space and a lower, enlarged space to permit bending of the finger.

In one embodiment, the soft shell includes a shell body and a pair of extensions extending from opposite sides of the shell body, each of the extensions has two sheets attached to each other, and the recess of the foam core is sized and shaped to receive the soft shell.

In another embodiment, the soft shell includes a shell body and a flange extending from a top edge of the shell body, and the recess of the foam core is sized and shaped to receive the soft shell.

The foam core include a first foam body and a second foam body disposed in the first foam body; the second foam body is more rigid than the first foam body; and the recess is defined in the second foam body of the foam core, wherein the first foam body of the foam core comprises expanded polystyrene, and the second foam body of the foam core comprises a copolymer of expanded polystyrene and expanded polyethylene.

The foam product is one of a board, a stand up paddle board, sit on top kayak, small sail boat, windsurf board, a snow board, and a skiing board.

The present invention includes an upper foam skin with a bottom surface bonded to the top surface of the foam core, wherein the upper foam skin defining a first hole aligned with an opening of the space of the soft shell.

In one embodiment, the foam product comprises a non-foam plastic film with a bottom surface bonded to the top surface of the upper foam skin, wherein the non-foam plastic film defining a second hole aligned with the first hole of the upper foam skin.

In one embodiment, the foam product includes a lower foam skin with a top surface bonded to a bottom surface of the foam core, and a non-foam plastic plate with a top surface bonded to a bottom surface of the lower foam skin.

In one embodiment, the foam product further comprises a foam skin with a surface bonded to a surface of the foam core, the foam core including a tightly packed cluster of expanded beads, wherein some outermost beads of the expanded beads are exposed and protruded on the surface of the foam core, and the foam skin has at its surface a plurality of cavities sized and shaped to respectively receive the protruded, outermost beads on the surface of the foam core.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 9A is an enlarged view of the foam product shown in FIG. 9;

FIG. 12 is a cross-sectional view of a foam product in accordance with a third embodiment of the present invention;

FIG. 12A is an enlarged view of the foam product shown in FIG. 12;

FIG. 13 is another cross-sectional view of the foam product shown in FIG. 12;

FIG. 13A is an enlarged view of the foam product shown in FIG. 13;

FIG. 13B is another enlarged view of the foam product shown in FIG. 13;

FIG. 14A is an enlarged view of the foam product shown in FIG. 14;

FIG. 14B is another enlarged view of the foam product shown in FIG. 14;

FIG. 15A is an enlarged view of the foam product shown in FIG. 15;

FIG. 15B is another enlarged view of the foam product shown in FIG. 15;

DETAILED DESCRIPTION OF EMBODIMENTS

Figure 1:
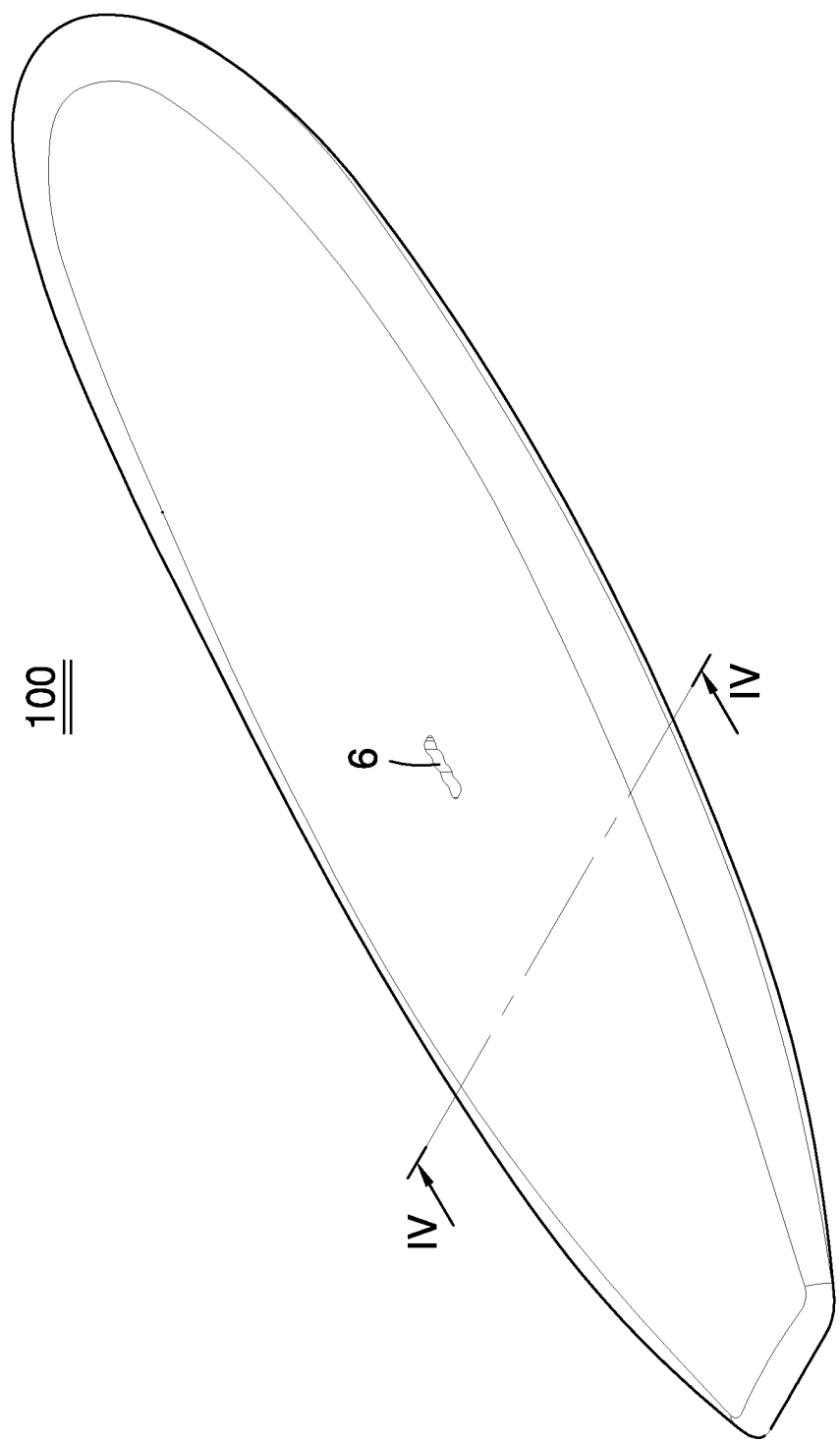
FIG. 1 is a perspective view of a foam product in accordance with a first embodiment of the present invention.
Figure 2:
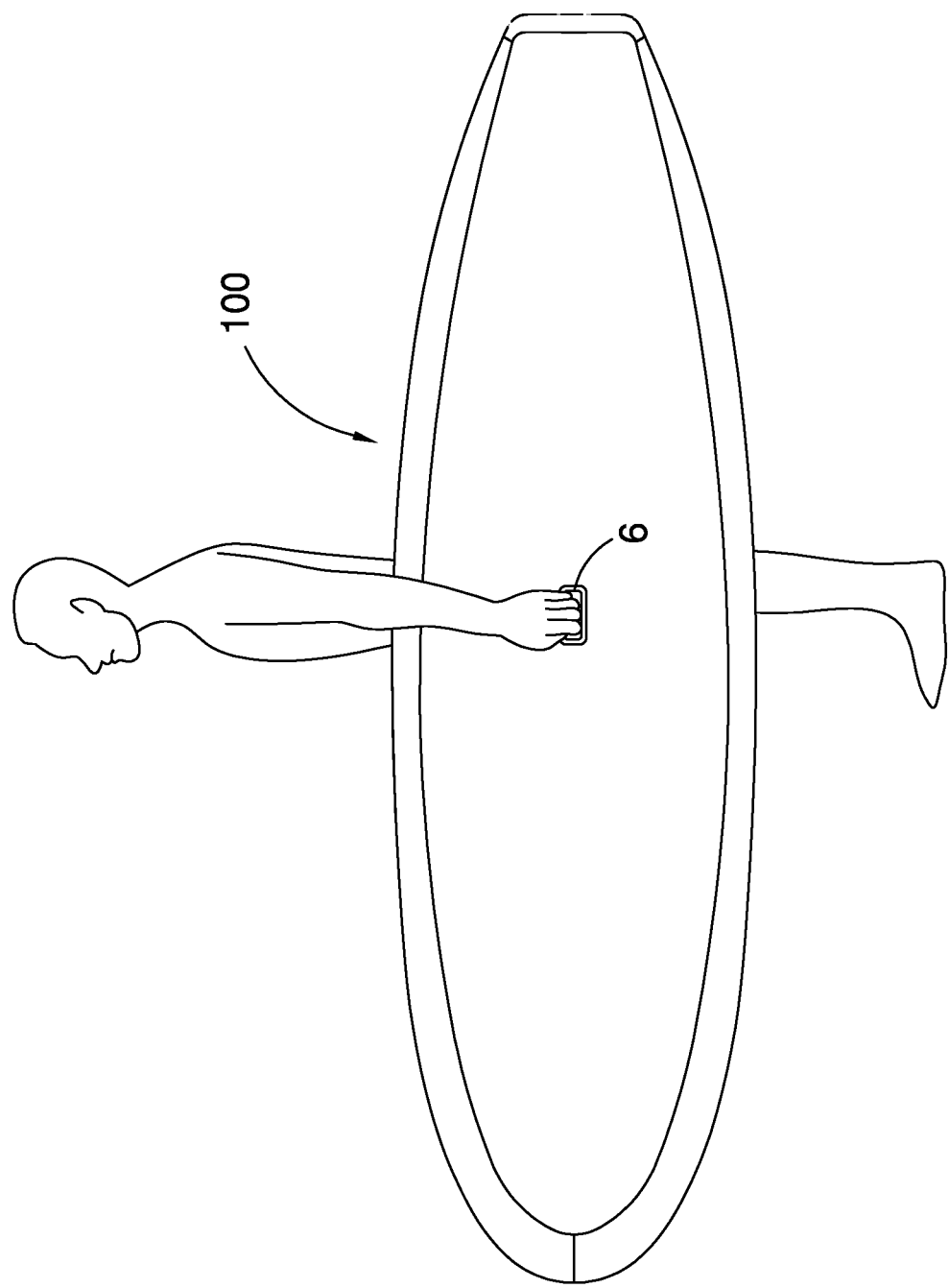
FIG. 2 illustrates that the foam product shown in FIG. 1 is carried by a user.
Figures 3, 3A:
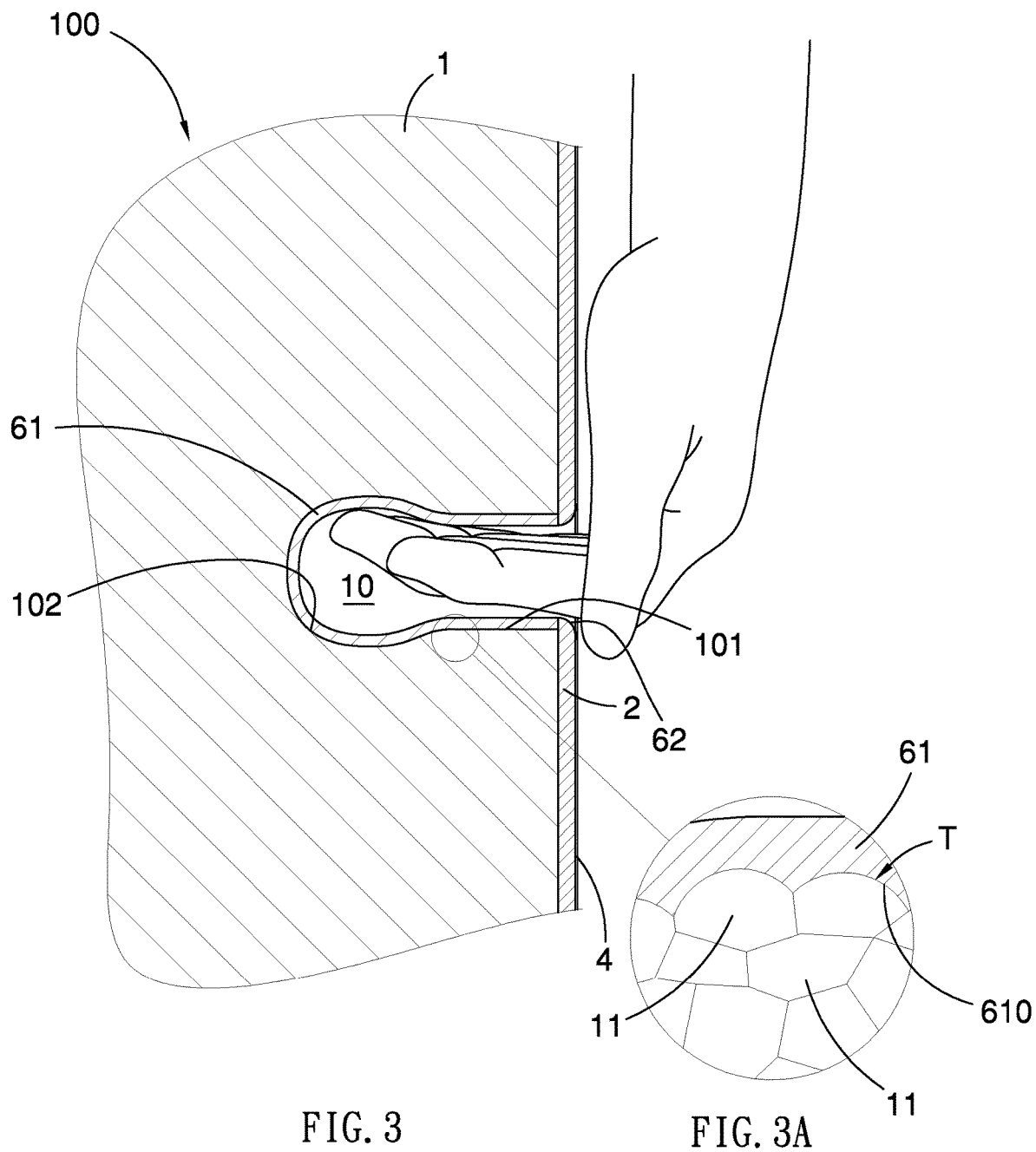
FIG. 3 is a partial cross-sectional view of the foam product shown in FIG. 1, showing that fingers of a hand are inserted into a recessed grip handle structure of the foam product.
FIG. 3A is an enlarged view of the foam product shown in FIG. 3.

Referring to FIGS. 1-6, there is shown a first embodiment of the foam product 100 according to the invention. The foam product 100 is a standup paddle board with a grip handle structure 6. A user can easily hold the foam product 100 using the grip handle structure 6 under the arm for transporting the foam product 100 in a comfortable and secure manner, as depicted in FIGS. 2 and 3.

Figure 4:
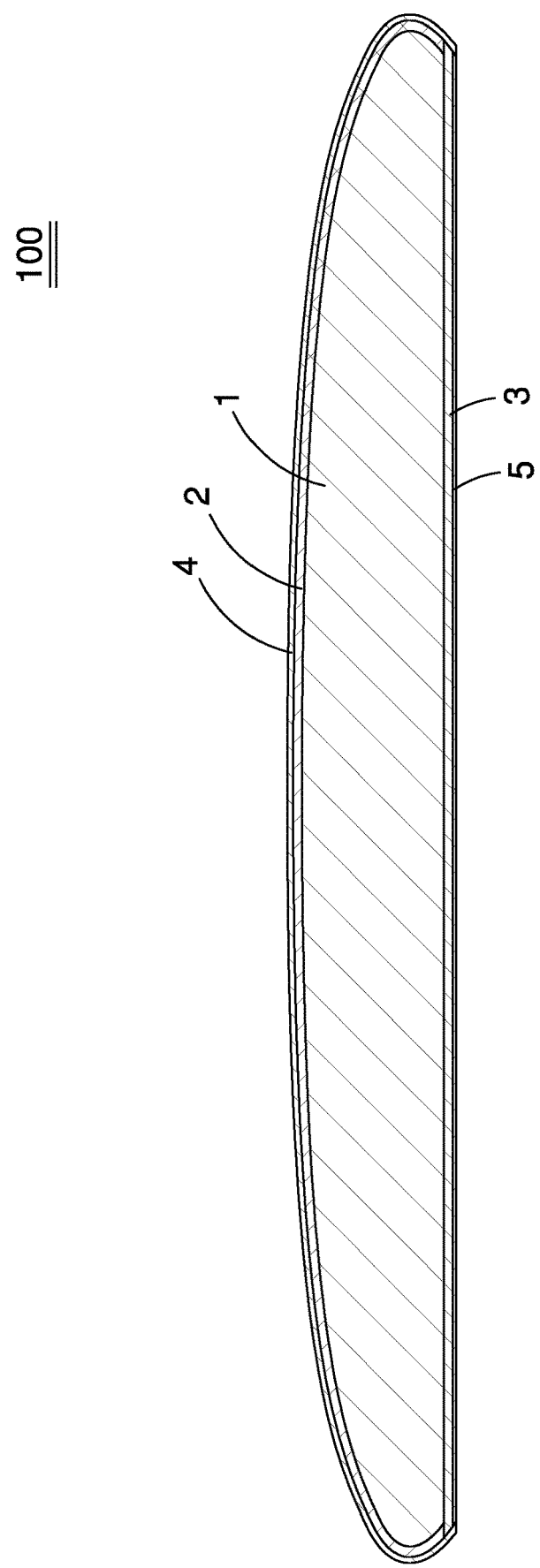
FIG. 4 is a cross-sectional view of the foam product shown in FIG. 1 taken along the line IV-IV.

As shown in FIG. 4, the foam product 100 further includes a foam core 1, an upper foam skin 2 and a lower foam skin 3. In this embodiment, the upper foam skin 2 is shaped like a half-shell and has a bottom surface glued to a top surface as well as side surfaces of the foam core 1. The lower foam skin 3 has a top surface glued to a bottom surface of the foam core 1. The foam core 1 is made of expanded polystyrene (EPS). The upper foam skin 2 and the lower foam skin 3 are both made of a relative softer material, such as expanded polyethylene (EPE) and each has a thickness of about 4 mm to 5 mm. The foam product 100 further includes a non-foam plastic film 4 and a non-foam plastic plate 5 for protection. The non-foam plastic film 4 has a bottom surface directly heat-laminated to the top surface of the upper foam skin 2. The non-foam plastic film 4 may be colored or printed with a pattern visible from the outside of the film 4. On the other hand, the non-foam plastic plate 5 is directly heat-laminated to the bottom surface of the lower foam skin 3. And, the non-foam plastic plate 5 is made of a wear-resistant material, such as polyethylene (PE), with a thickness of about 0.3 mm to 1.5 mm. Referring back to FIG. 3, the grip handle structure 6 includes a soft shell 61 and an opening 62 extending through the upper foam skin 2 and the non-foam plastic film 4. The soft shell 61 is preferably made of an irradiated cross-linked polyethylene foam, with a thickness of about 2 mm to 3 mm.

Figure 5:
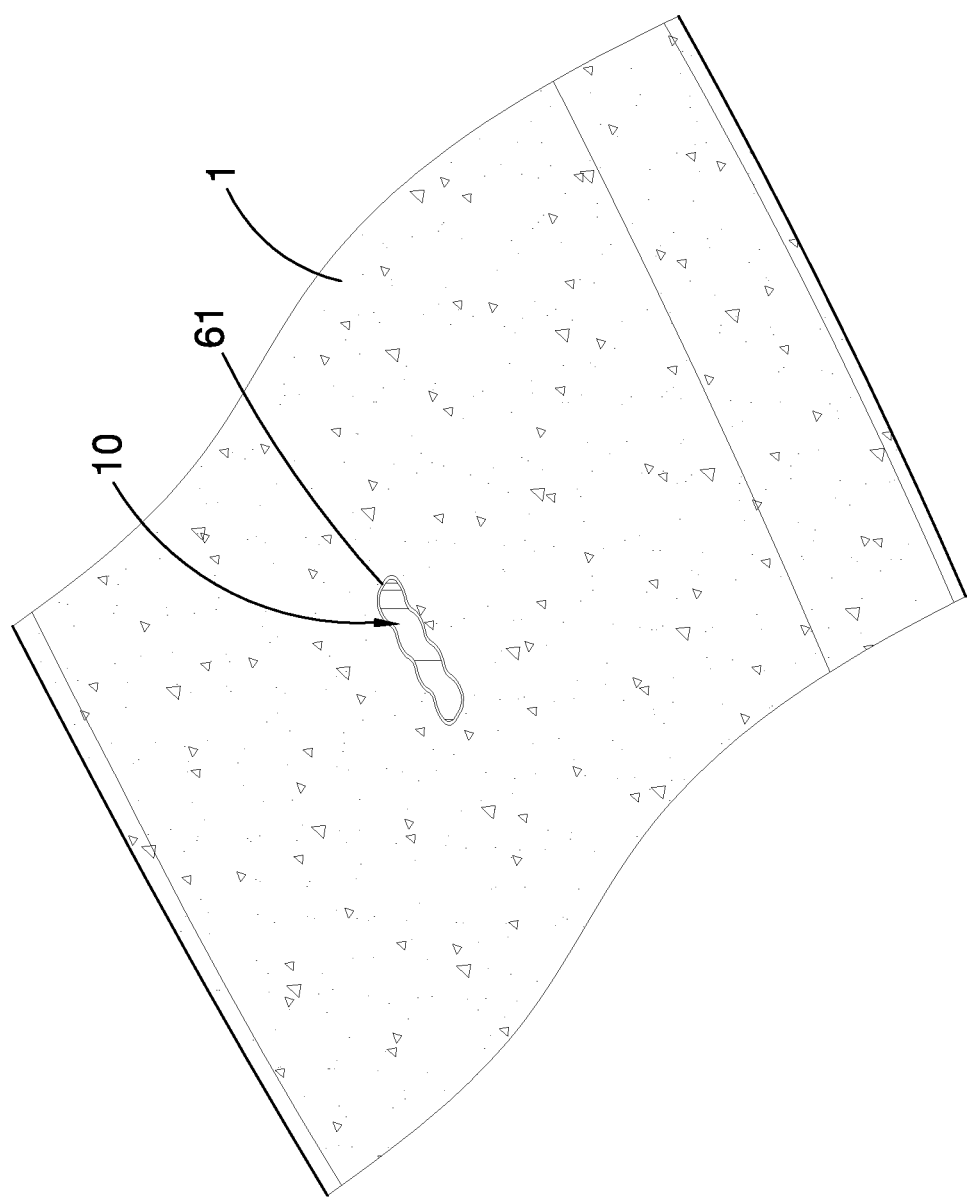
FIG. 5 is a perspective view of a foam core and a soft shell of the foam product shown in FIG. 1.
Figures 6, 6A:
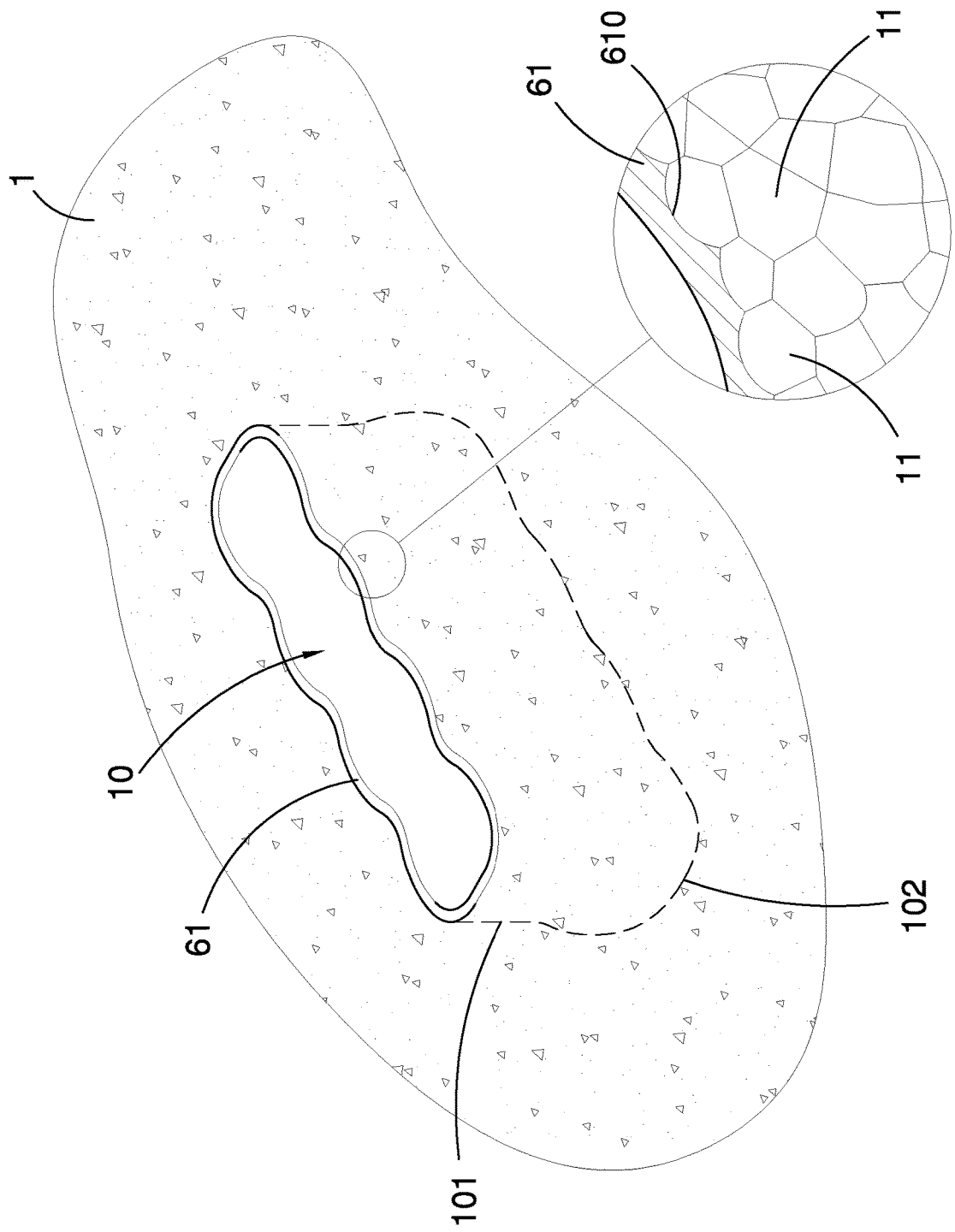
FIG. 6 is an enlarged view of the foam product shown in FIG. 5.
FIG. 6A is an enlarged view of the foam product shown in FIG. 6.
Figure 7:
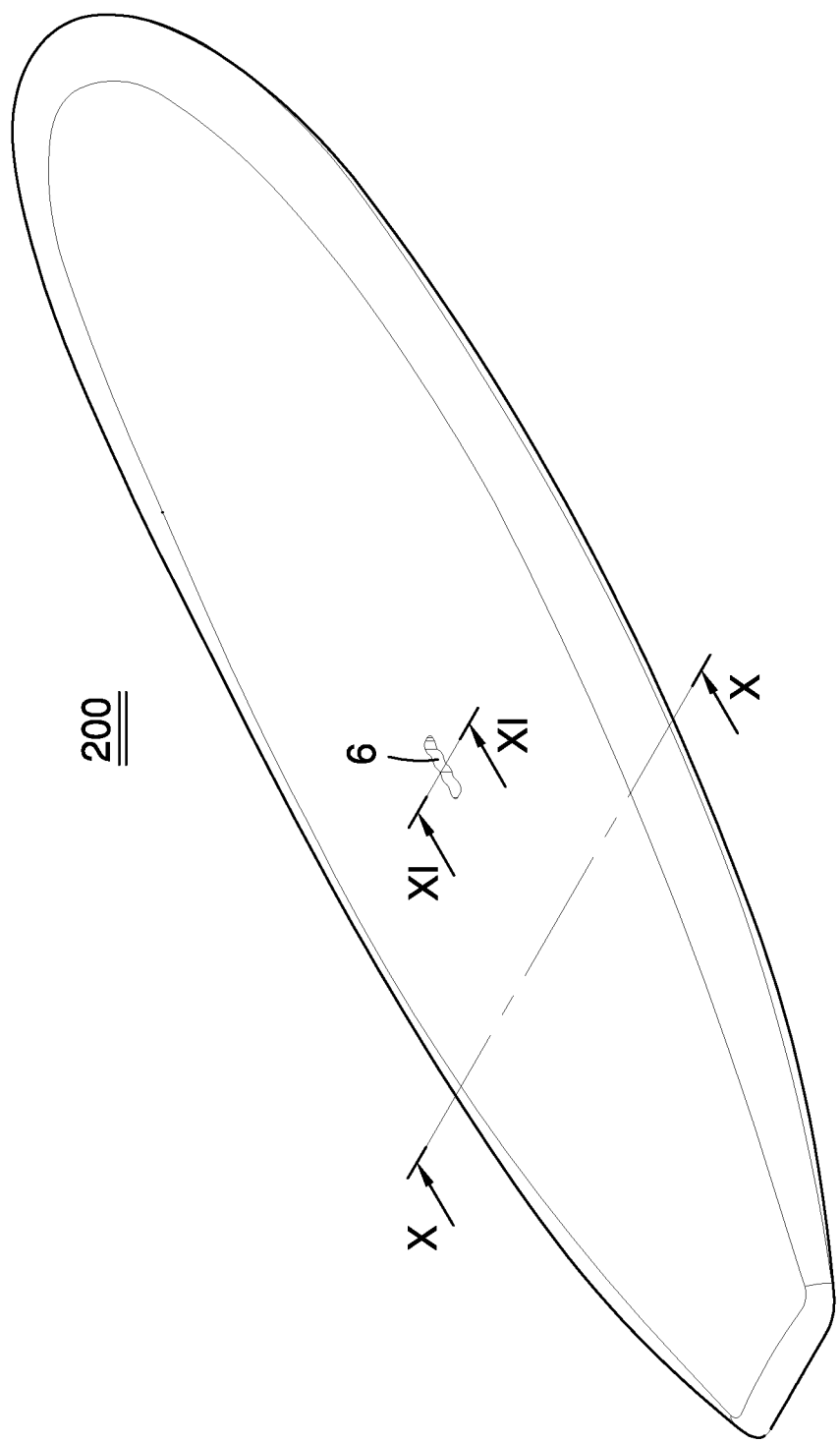
FIG. 7 is a perspective view of a foam product in accordance with a second embodiment of the present invention.

FIG. 5 illustrates the foam core 1 with a recess 10 in which the soft shell 61 is disposed. As shown in FIGS. 6 and 6A, the foam core 1 includes a tightly packed cluster of expanded beads 11. Each of the expanded beads 11 is made of a pre-expanded polystyrene bead. The foam core 1 defines the recess 10 in its top surface. The recess 10 has an upper space 101 and a lower, enlarged space 102. The soft shell 61 is suited in the recess 10 of the foam core 1 and has an upper space (not numbered) configured in size to receive four fingers of a human hand, and a lower, enlarged space (not numbered) to permit bending of the fingers, as shown in FIG. 3, as well.

It is noted that, some outermost beads 11 of the expanded beads 11 are exposed and bulging outward from the inner wall of the recess 10 of the foam core 1 with different heights to form a bubbly texture T. The soft shell 61 has its outer wall bonded to the inner wall of the recess 10 of the foam core 1. More specifically, as shown in FIGS. 3A and 6A, the soft shell 61 has a plurality of concave cavities 610 at its outer wall. Each of the concave cavities 610 of the soft shell 61 matedly surrounds a respective one of the bulging, outermost beads 11 in the recess 10 of the foam core 1. In contrast, the inner wall of the soft shell 61 is relatively more flat than the outer wall of the soft shell 61. In other words, the concave cavities 610 are defined only in the outer wall of the soft shell 61, not the inner wall of the soft shell 61. The soft shell 61 and the foam core 1 are firmly bonded together due to the inter-engaged convex and concave surfaces between the soft shell 61 and the foam core 1. Besides, it should be noted that the soft shell 61 and the foam core 1 may be directly heat bonded to each other with similar materials. Alternatively, an adhesive may be employed in between the soft shell 61 and the foam core 1 to further enhance the bonding between the two.

Referring to FIGS. 7-11, there is shown a second embodiment of the foam product 200 according to the invention. The foam product 200 of the second embodiment is generally identical to the foam product 100 of the first embodiment in appearance, and has a grip handle structure 6 for being grasped. However, the foam product 200 is slightly different from the foam product 100 in the interior structure. For example, the foam core 1 of the foam product 100 is made of a single foam body with the same material; however, the foam product 200 is a combination of two foam bodies with different materials and densities.

Figure 8:
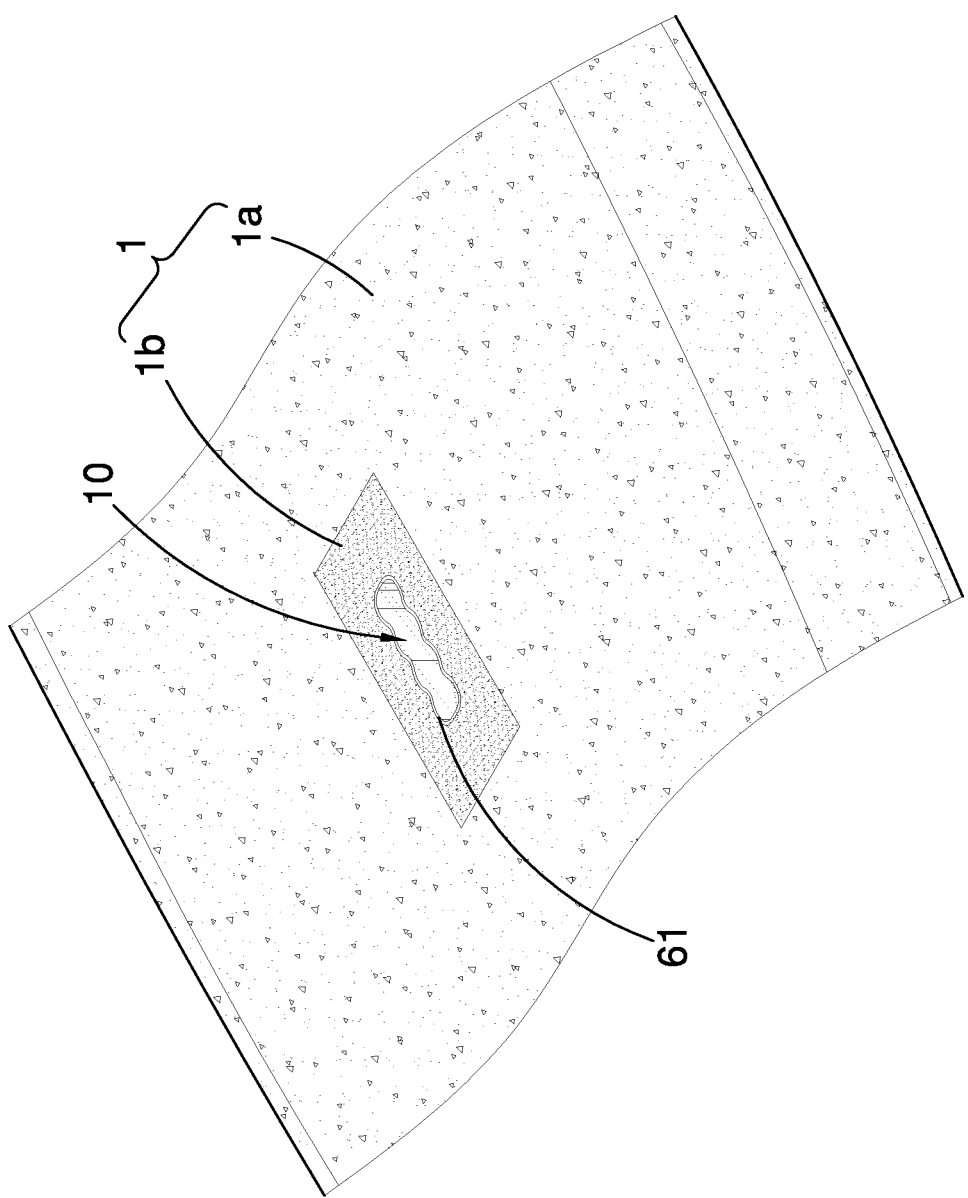
FIG. 8 is a perspective view of a foam core and a soft shell of the foam product shown in FIG. 7.
Figure 9:
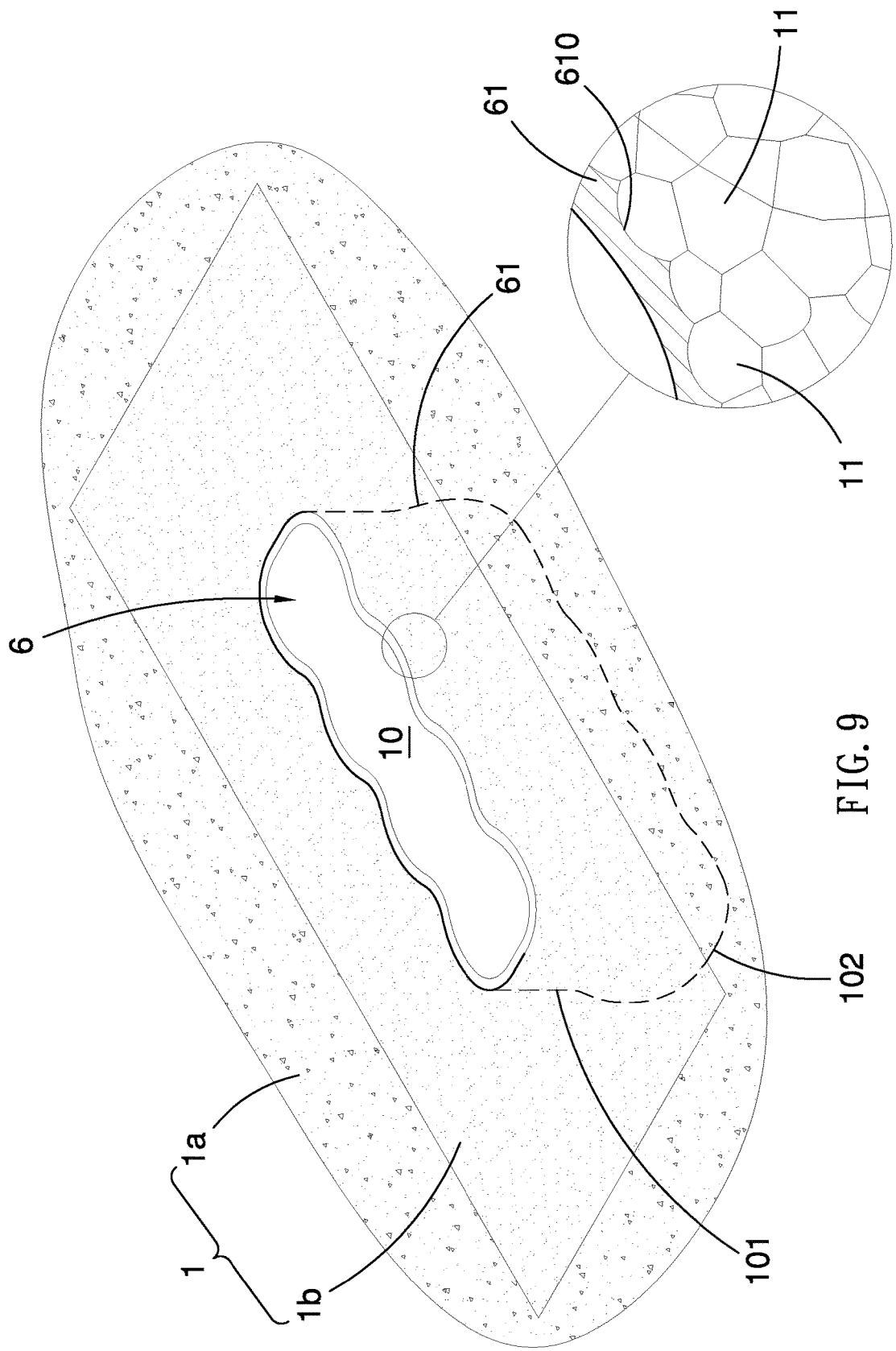
FIG. 9 is an enlarged view of the foam product shown in FIG. 8.

FIG. 8 illustrates a perspective view of the foam core 1 and the soft shell 61 of the foam product 200. As shown, the foam core 1 includes a first foam body 1a and a second foam body 1b embedded in the first foam body 1a. Specifically, the second foam body 1b is more rigid than the first foam body 1a. The recess 10 is defined in the second foam body 1b of the foam core 1. The first foam body 1a is made of expanded polystyrene, and the second foam body 1b is made of a copolymer of expanded polystyrene and expanded polyethylene. As best seen in FIG. 9, the recess 10 has an upper space 101 and a lower, enlarged space 102. The soft shell 61 is suited in the recess 10 of the second foam body 1b of the foam core 1, and has an upper space (not numbered) configured in size to receive four fingers of a human hand, and a lower, enlarged space (not numbered) to permit bending of the fingers, as shown in FIG. 9.

Figure 10:
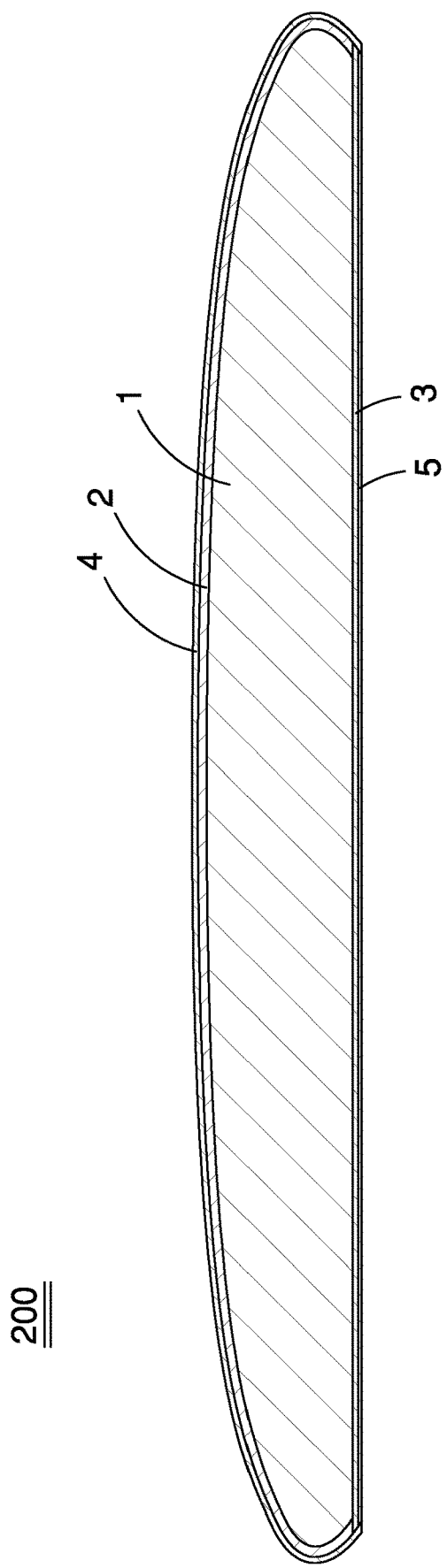
FIG. 10 is a cross-sectional view of the foam product shown in FIG. 7 taken along the line X-X.
Figure 11A:
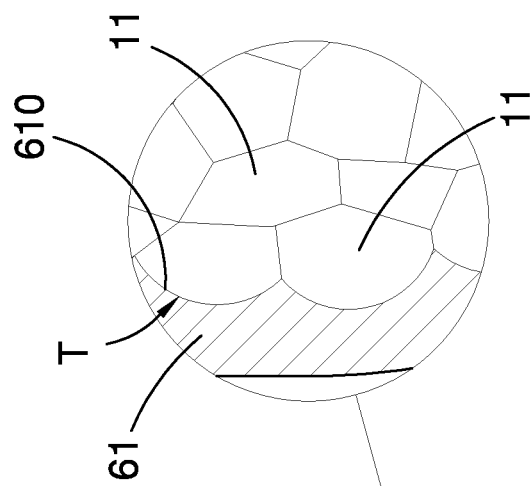
FIG. 11A is an enlarged view of the foam product shown in FIG. 11.
Figure 11:
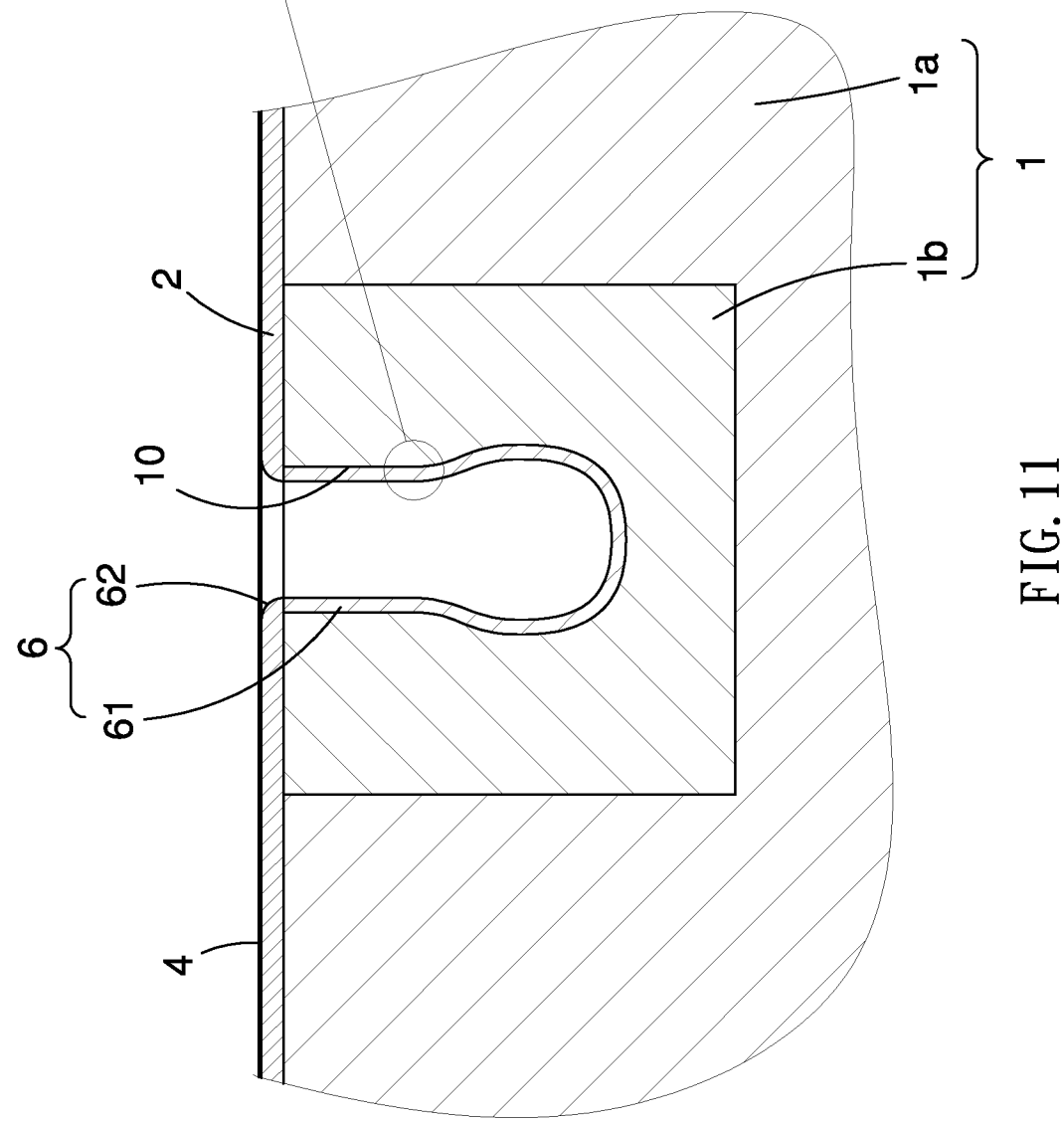
FIG. 11 is a cross-sectional view of the foam product shown in FIG. 7 taken along the line XI-XI.

As shown in FIG. 10, the foam product 200 further includes an upper foam skin 2 and a lower foam skin 3. The upper foam skin 2 is shaped like a half-shell and has a bottom surface glued to a top surface as well as side surfaces of the foam core 1. The lower foam skin 3 has a top surface glued to a bottom surface of the foam core 1. The upper foam skin 2 and the lower foam skin 3 are both made of a relative softer material, such as expanded polyethylene (EPE) and each has a thickness of about 4 mm to 5 mm. The foam product 200 further includes a non-foam plastic film 4 and a non-foam plastic plate 5 for protection. The non-foam plastic film 4 has a bottom surface directly heat-laminated to the top surface of the upper foam skin 2. And, the non-foam plastic film 4 may be colored or printed with a pattern visible from the outside of the film 4. The non-foam plastic plate 5 is directly heat-laminated to the bottom surface of the lower foam skin 3. And, the non-foam plastic plate 5 is made of a wear-resistant material, such as polyethylene (PE), with a thickness of about 0.3 mm to 1.5 mm. As shown in FIG. 11, the grip handle structure 6 includes a soft shell 61 and an opening 62 extending through the upper foam skin 2 and the non-foam plastic film 4. The soft shell 61 is preferably made of an irradiated cross-linked polyethylene foam, with a thickness of about 2 mm to 3 mm.

Referring back to FIGS. 9 and 9A, the second foam body 1b of the foam core 1 includes a tightly packed cluster of expanded beads 11. Each of the expanded beads 11 is made of a pre-expanded bead. Similarly, the first foam body 1a of the foam core 1 is made of a tightly packed cluster of expanded beads 11, not shown, but with a different material. As shown in FIGS. 11 and 11A, some outermost beads 11 of the expanded beads 11 are exposed and bulging outward from the inner wall of the recess 10 of the second foam body 1b with different heights to form a bubbly texture T. The soft shell 61 has its outer wall attached to the inner wall of the recess 10 of the foam core 1. More specifically, the soft shell 61 has a plurality of concave cavities 610 at its outer wall. Each of the concave cavities 610 of the soft shell 61 matedly surrounds a respective one of the bulging, outermost beads 11 in the recess 10 of the second foam body 1b. In contrast, the inner wall of the soft shell 61 is relatively more flat than the outer wall of the soft shell 61. In this manner, the soft shell 61 and the second foam body 1b are firmly bonded together due to the inter-engaged convex and concave surfaces between the soft shell 61 and the second foam body 1b. It should be noted that the soft shell 61 and the second foam body 1b may be directly heat bonded to each other with similar materials. Alternatively, an adhesive may further be employed to further enhance the bonding of the soft shell 61 and the second foam body 1b.

Referring to FIGS. 12-13, there is shown a third embodiment of the foam product 300 according to the invention. The foam product 300 of the third embodiment is generally identical to the foam product 200 of the second embodiment in appearance and in structure. For example, the foam core 1 of the foam product 300 also includes a first foam body 1a and a second foam body 1b. However, the foam core 1 and the upper foam skin 2 of the foam product 300 are bonded in a different manner.

As shown in FIGS. 12 and 12A, some outermost beads 11 of the expanded beads are exposed and bulging outward from the top surface of the first foam body 1a of the foam core 1 with different heights to form a bubbly texture T. Referring to FIG. 13, the upper foam skin 2 has at its bottom surface a plurality of concave cavities 20 each matedly surrounding a respective one of the bulging, outermost beads 11 on the top surface of the first foam body 1a, except that a small area of the bottom surface of the upper foam skin 2 is adhered to the top surface of the second foam body 1b. In other words, the upper foam skin 2 is partly bonded to the second foam body 1b via adhesives, and is mostly bonded to the first foam body 1a via the inter-engaged convex and concave surfaces, as shown in FIG. 13A.

Likewise, the soft shell 61 is bonded to the second foam body 1b via the inter-engaged convex and concave surfaces, as shown in FIG. 13B.

Figure 14:
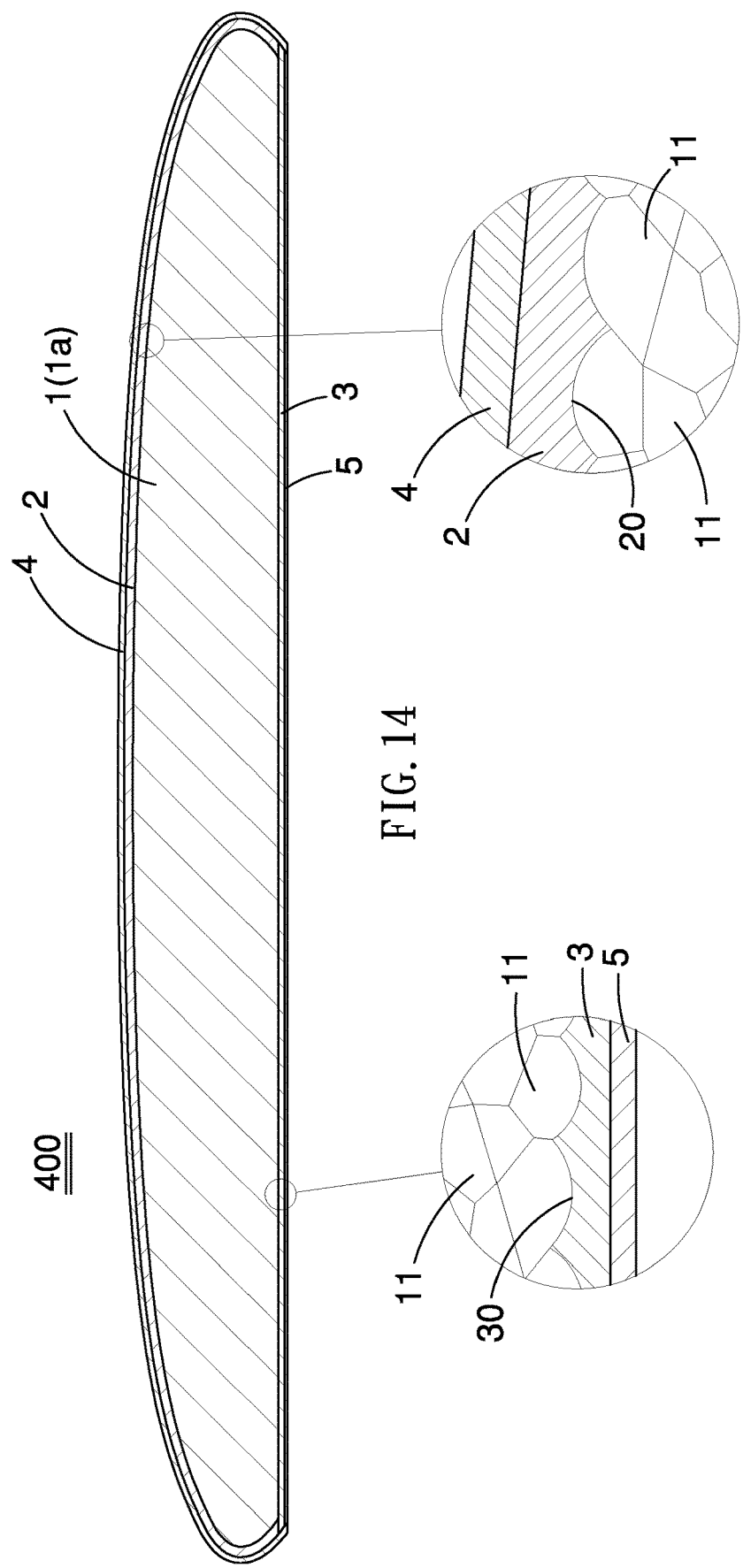
FIG. 14 is a cross-sectional view of a foam product in accordance with a fourth embodiment of the present invention.

Referring to FIGS. 14, 14A and 14B, there is shown a fourth embodiment of the foam product 400 according to the invention. The foam product 400 of the fourth embodiment is generally identical to the foam product 300 of the third embodiment. For example, the foam core 1 of the foam product 400 includes a first foam body 1a and a second foam body (not shown); and the upper foam skin 2 is bonded to the first foam body 1a via the inter-engaged convex and concave surfaces, as shown in FIG. 14B. However, unlike the third embodiment, the foam core 1 and the lower foam skin 3 of the foam product 400 of this fourth embodiment are bonded in a different manner, as shown in FIG. 14A.

In FIG. 14A, some outermost beads 11 of the expanded beads are exposed and bulging outward from the bottom surface of the first foam body 1a of the foam core 1 with different heights to form a bubbly texture T. The lower foam skin 3 has at its top surface a plurality of concave cavities 30 each matedly surrounding a respective one of the bulging, outermost beads 11 on the bottom surface of the first foam body 1a. As such, the lower foam skin 3 is firmly bonded to the first foam body 1a via the inter-engaged convex and concave surfaces as well.

Figure 15:
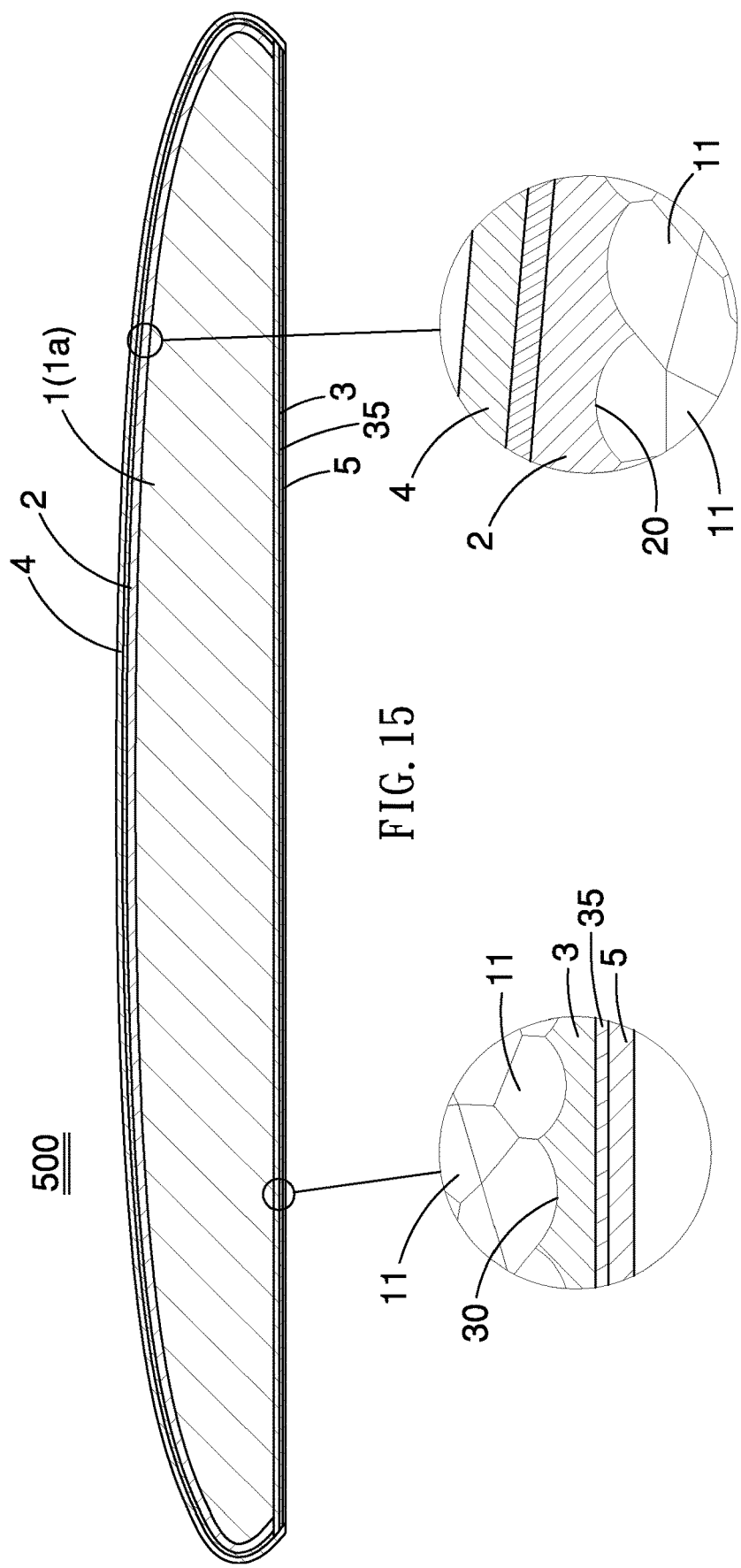
FIG. 15 is a cross-sectional view of a foam product in accordance with a fifth embodiment of the present invention.

Referring to FIGS. 15, 15A and 15B, there is shown a fifth embodiment of the foam product 500 according to the invention. The foam product 500 of the fifth embodiment is generally identical to the foam product 400 of the fourth embodiment, except that a non-foam plastic film 35 is interposed in between the lower foam skin 3 and the non-foam plastic plate 5.

In practice, the expanded beads of the foam core 1 may be made of expanded polypropylene or expanded polystyrene. The upper foam skin 2 may be made of expanded polyethylene. The upper non-foam plastic film 4 may be made of ethylene. Furthermore, the upper foam skin 2 has a thickness greater than that of the foam core 1, but smaller than that of the upper non-foam plastic film 4.

It is noted that, the foam product 500 has a base structure which includes the lower foam skin or layer 3 bonded to the bottom, inner surface of the foam core 1, the non-foam plastic plate 5 joined to the bottom surface of the foam layer 3, the non-foam plastic film 35 interposed in between the foam layer 3 and the non-foam plastic plate 5, and a pattern (not shown) printed on the non-foam plastic film 35 and visible through the non-foam plastic plate 5. Preferably, the non-foam plastic film 35 and the non-foam plastic plate 5 may both be made of ethylene.

Figure 16:
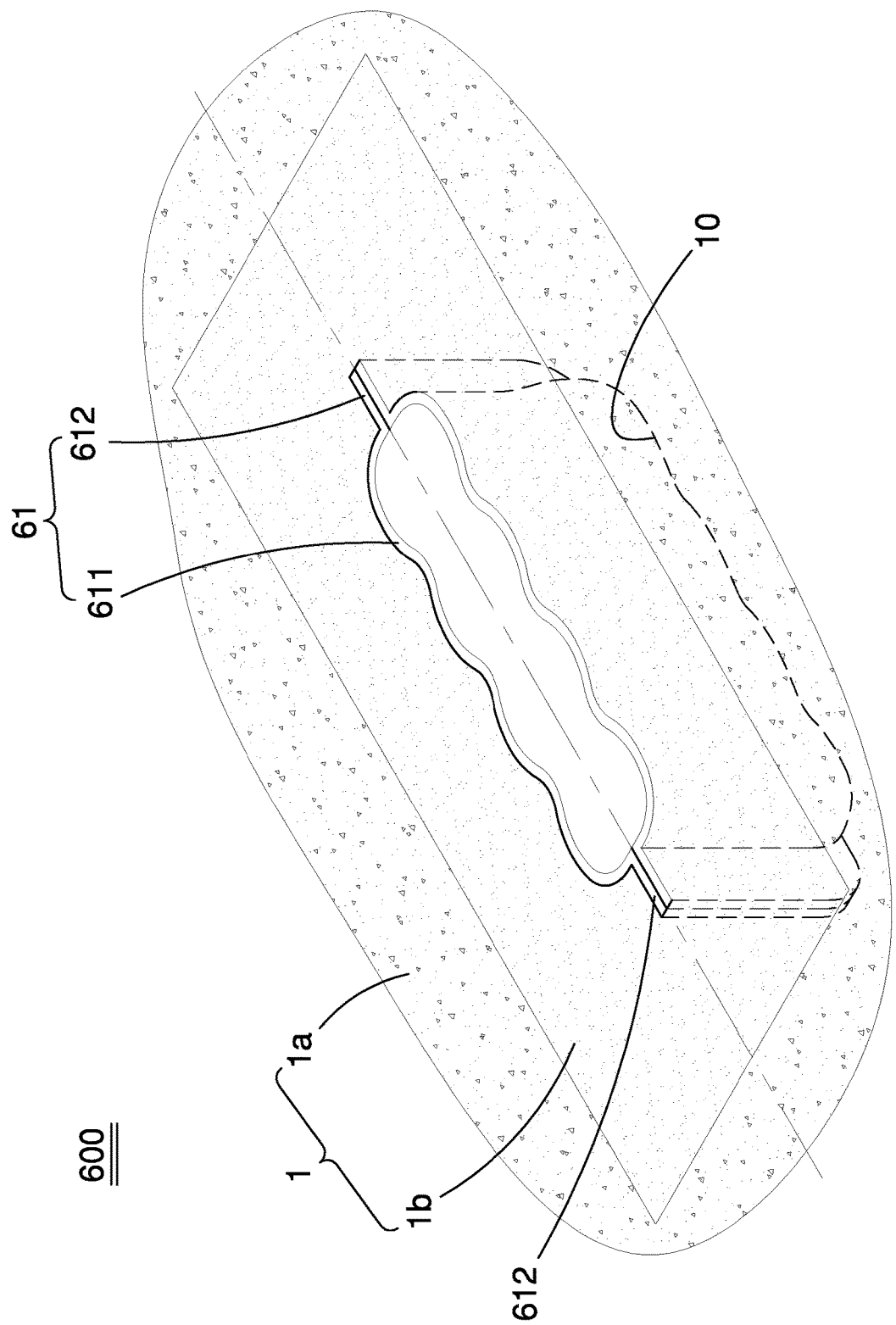
FIG. 16 is a perspective view of a foam core and a soft shell of a foam product in accordance with a sixth embodiment of the present invention.

Referring to FIG. 16, there is shown a sixth embodiment of the foam product 600 according to the invention. The foam product 600 of the sixth embodiment is generally identical to the foam product 300 of the third embodiment. For example, the foam core 1 of the foam product 600 includes a first foam body 1*a* and a second foam body 1*b*; and the upper foam skin 1 is bonded to the first foam body 1*a* via the inter-engaged convex and concave surfaces. However, the soft shell 61 of the foam product 600 is slightly different from that of the foam product 300.

As shown in FIG. 16, the soft shell 61 includes a shell body 611 and a pair of extensions 612 extending from opposite sides of the shell body 611. Each of the extensions 612 has two sheets (not numbered) attached to each other. The recess 10 of the second foam body 1*b* of the foam core 1 is sized and shaped to receive the whole soft shell 61, namely both the shell body 611 and the extensions 612.

Figure 17:
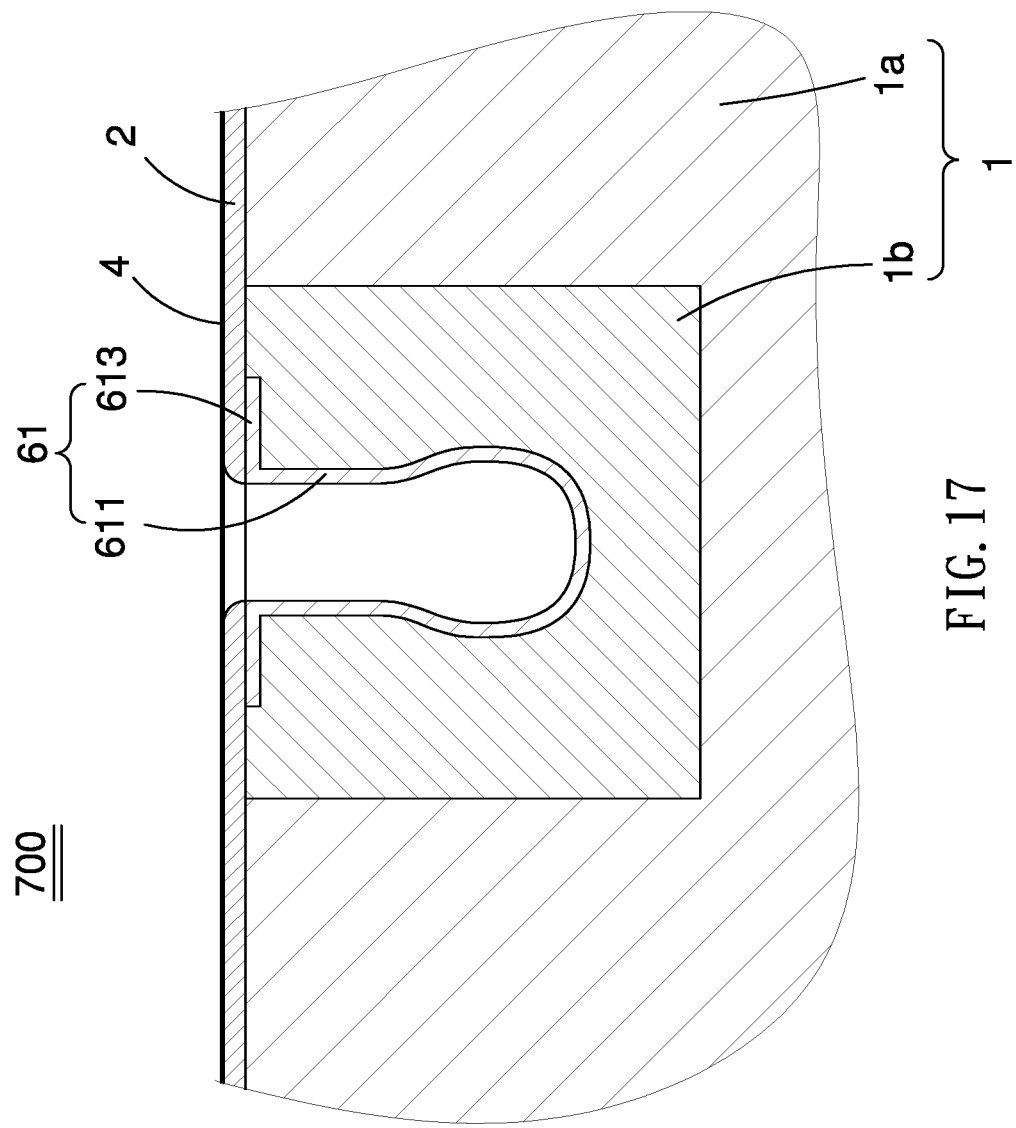
FIG. 17 is a partial cross-sectional view of a foam product in accordance with a seventh embodiment of the present invention.
Figure 18:
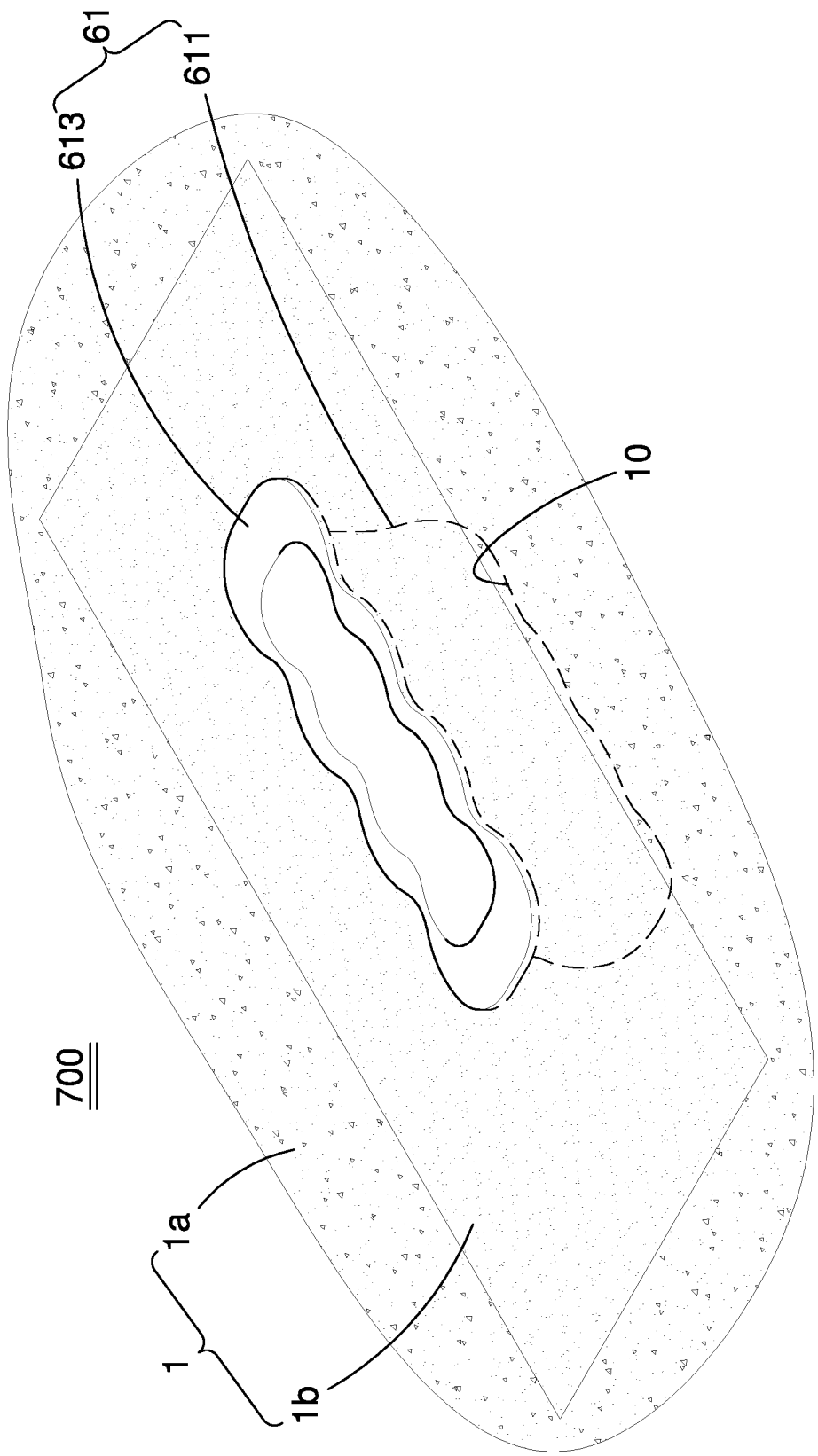
FIG. 18 is a perspective view of a foam core and a soft shell of the foam product shown in FIG. 17.

Referring to FIGS. 17 and 18, there is shown a seventh embodiment of the foam product 700 according to the invention. The foam product 700 of the seventh embodiment is generally identical to the foam product 300 of the third embodiment. For example, the foam core 1 of the foam product 700 includes a first foam body 1*a* and a second foam body 1*b*; and the upper foam skin 1 is bonded to the first foam body 1*a* via the inter-engaged convex and concave surfaces. However, the soft shell 61 of the foam product 700 is slightly different from that of the foam product 300.

As shown in FIG. 17 or 18, the soft shell 61 includes a shell body 611 and a flange 613 extending from a top edge of the shell body 611. The recess 10 of the second foam body 1*b* of the foam core 1 is sized and shaped to receive the whole soft shell 61, namely both the shell body 611 and the flange 613.

As described above, the present invention provides a foam product in which the soft shell and/or the foam skin may be firmly bonded to the foam core using the characteristic of the expanded beads of the foam core. The foam product may be one of a stand up paddle board, sit on top kayak, small sail boat, a windsurf board, a snow board, a skiing board, and other craft boards that are too wide to be carried under the arm. It is noted that the foam product is not limited to be shaped like a board or plate. Instead, the foam product would be non-flattened with a different shape.

Referring to FIGS. 19 to 23, there is shown an eighth embodiment of the foam product 800 according to the invention. The foam product 800 of the eighth embodiment is directed to a bicycle saddle having a foam structure similar to that of the aforementioned embodiments.

Figure 19:
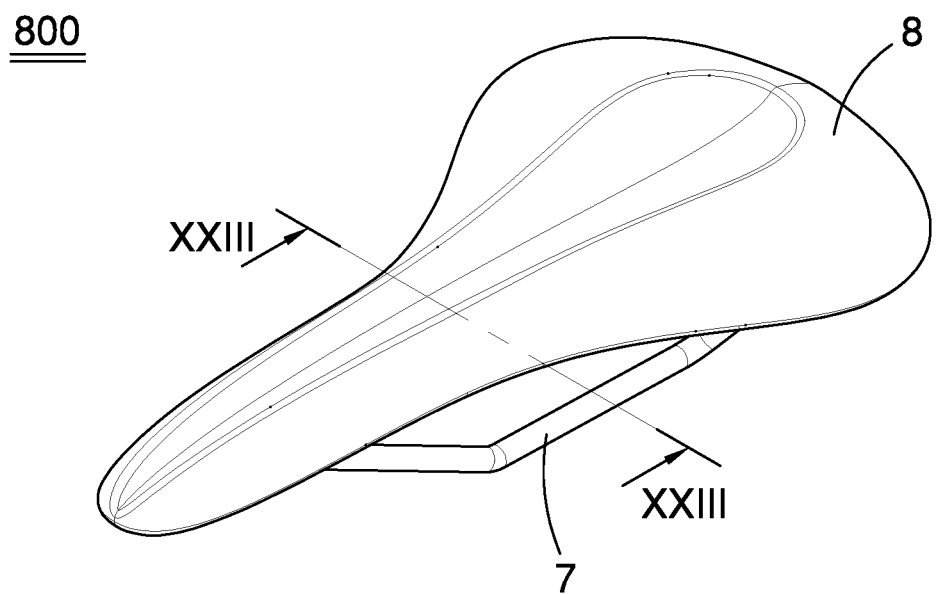
FIG. 19 is a top perspective view of a foam product in accordance with an eighth embodiment of the present invention.
Figure 20:
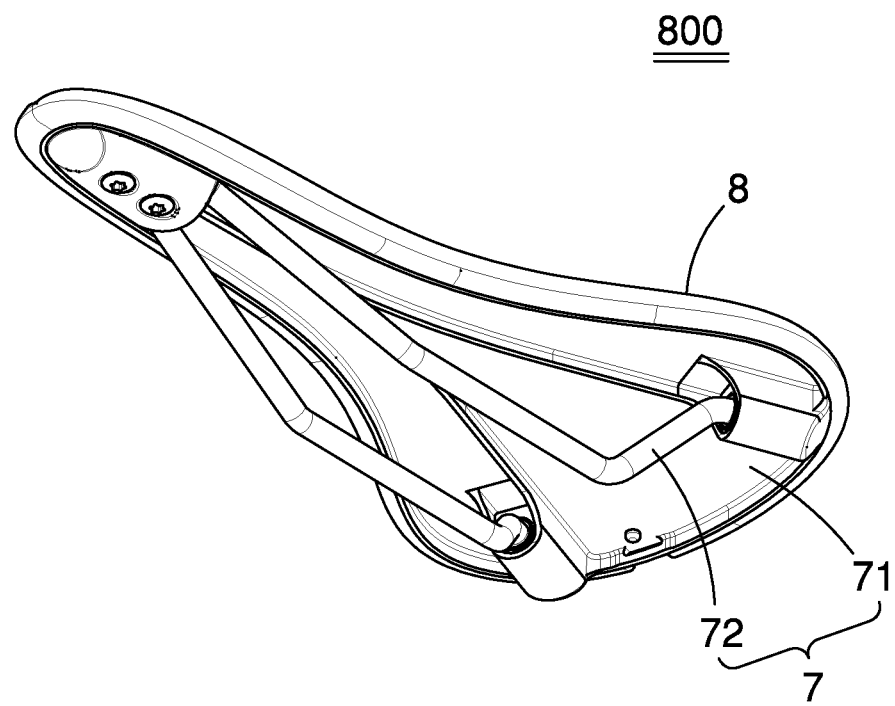
FIG. 20 is a bottom perspective view of the foam product shown in FIG. 19.
Figure 21:
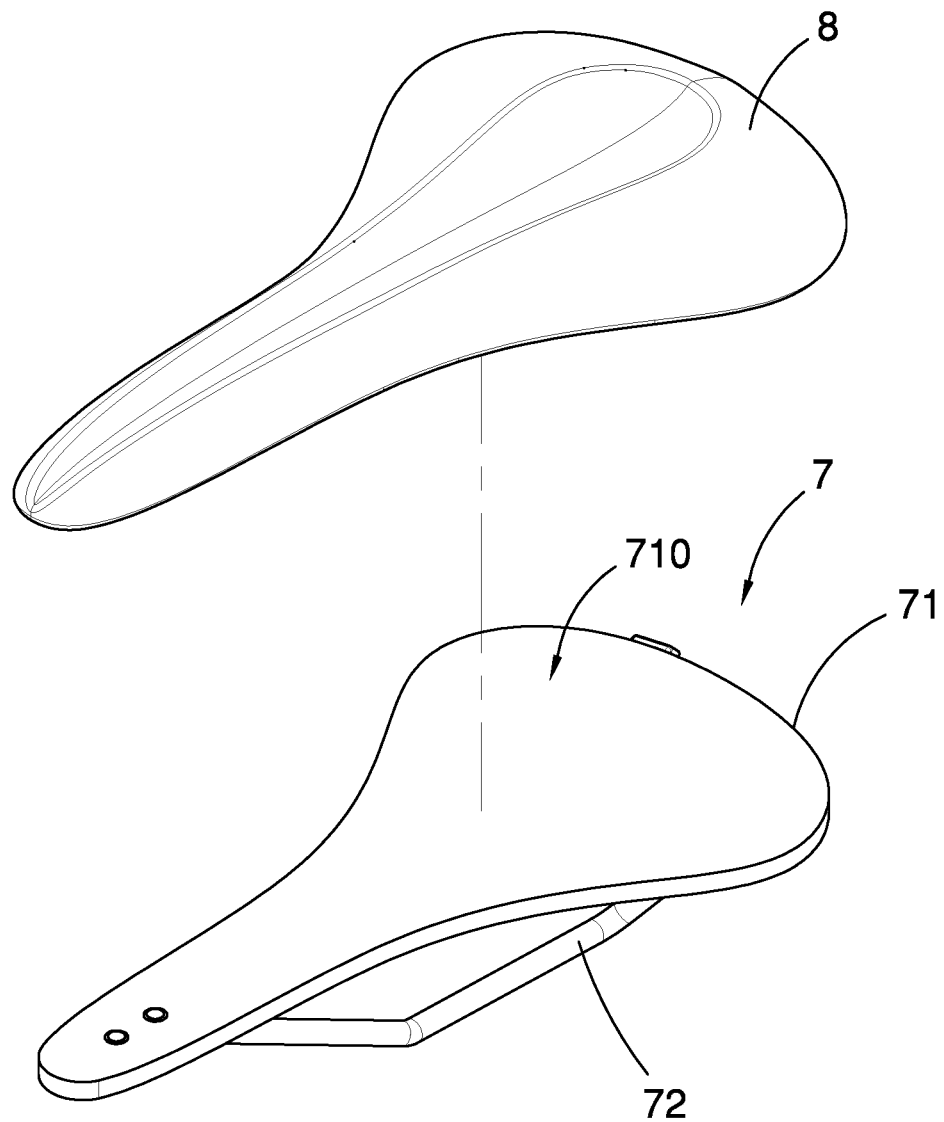
FIG. 21 is an exploded view of the foam product shown in FIG. 19.
Figure 22:
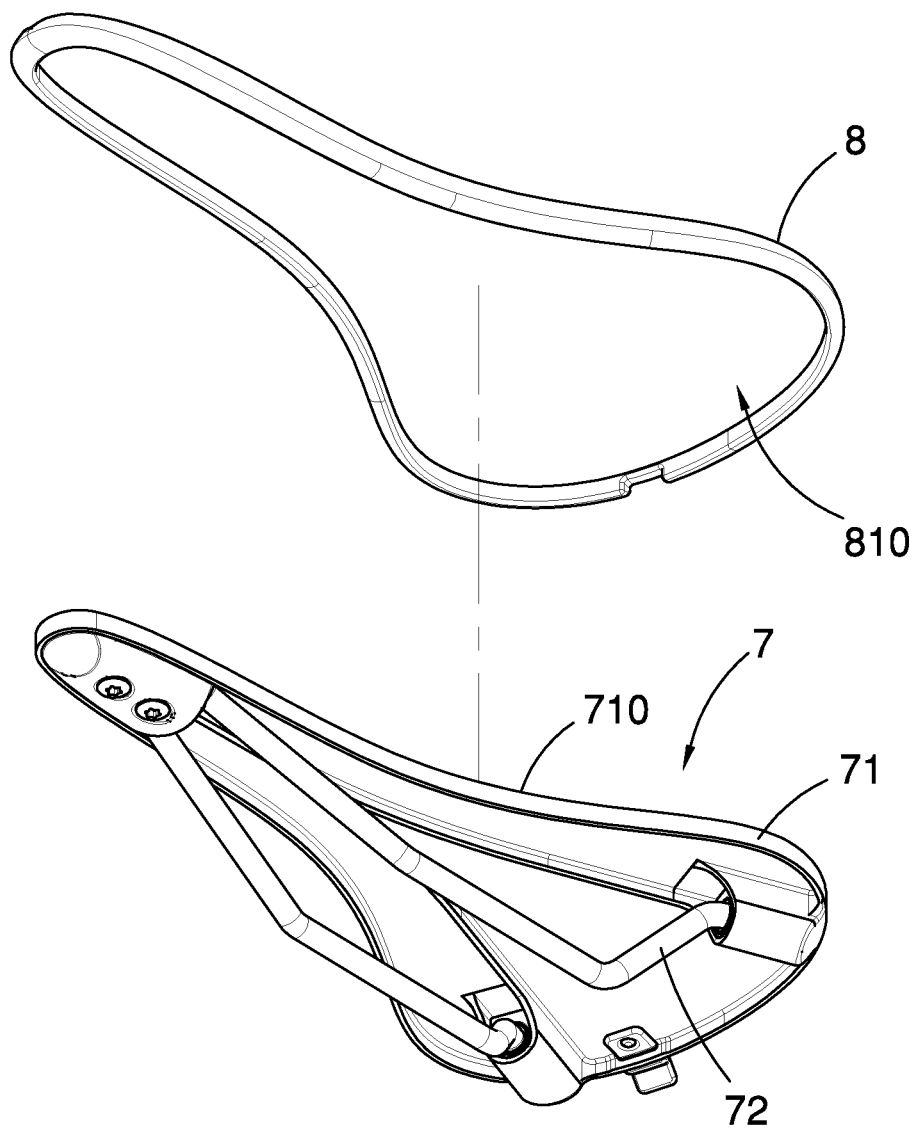
FIG. 22 is an exploded view of the foam product shown in FIG. 20.

As shown in FIG. 19, the foam product 800 in form of a bicycle saddle includes a base structure 7, and a saddle cushion 8 mounted on the base structure 7. As shown in FIG. 20, the base structure 7 generally includes a saddle shell 71 and a support rail 72 mounted underneath the saddle shell 71, as known in the art. As shown in FIGS. 21 and 22, the saddle shell 71 has a flat top surface 710 bonded to a flat bottom surface 810 of the saddle cushion 8 with adhesives, for example. Preferably, the saddle shell 71 is made of a fiber-reinforced plastic.

Figure 23A:
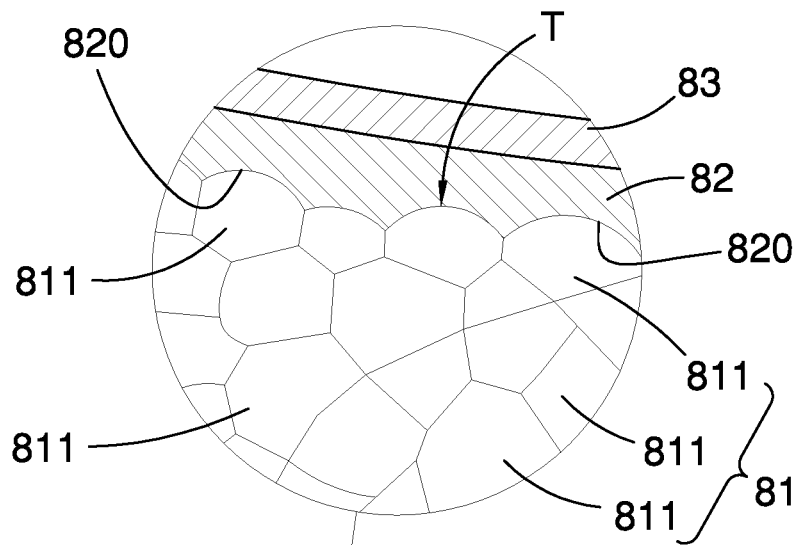
FIG. 23A is a partial enlarged view of the foam product shown in FIG. 23.
Figure 23:
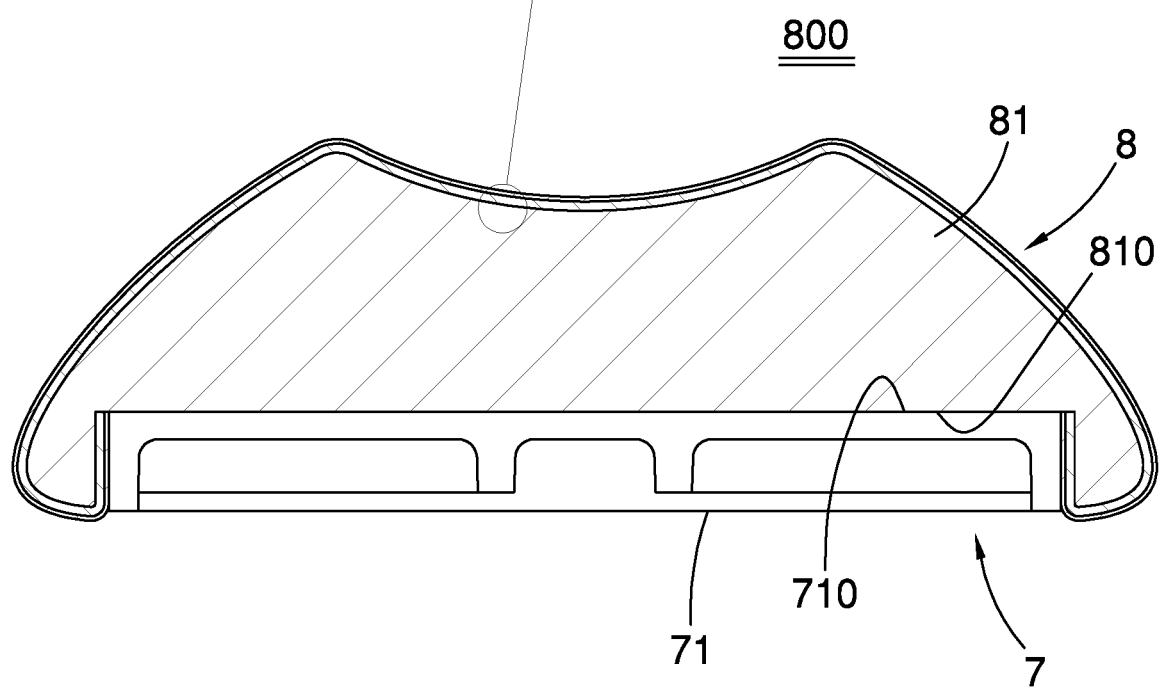
FIG. 23 is a cross-sectional view of the foam product shown in FIG. 19 taken along the line XXIII-XXIII.

As best seen in FIG. 23, the saddle cushion 8 of the bicycle saddle 800 generally includes a foam core 81, a foam skin 82 and a non-foam plastic film 83. The foam core 81 has its flat bottom surface 810 bonded to the flat top surface of the saddle shell 71 of the base structure 7 with adhesives. The foam skin 82 has an inner surface attached to the outer surface of the foam core 81, and the non-foam plastic film 83 is disposed on an outer surface of the foam skin 82. A pattern (not shown) may be printed on an inner surface of the non-foam plastic film 83 and sandwiched in between the foam skin 82 and the non-foam plastic film 83. Moreover, the foam skin 82 has a thickness greater than that of the foam core 81, but smaller than that of the non-foam plastic film 83. It is understood that, the foam core 81 serves as a padding of the bicycle saddle 800, and the foam skin 82 along with the non-foam plastic film 83 serves as an overlying layer covering the padding.

As depicted in FIG. 23A, the foam core 81 of the saddle cushion 8 includes a tightly packed cluster of expanded beads 811. Each of the expanded beads 811 may be made of a pre-expanded polypropylene bead, a pre-expanded polystyrene bead, a pre-expanded polyethylene bead or a pre-expanded polystyrene-polyethylene composite bead. The foam core 81 of the expanded beads has an outer surface on which some outermost beads of the expanded beads 811 are exposed and bulging outward with different heights to form a bubbly texture T. On the other hand, the foam skin 82 has an inner surface attached to the outer surface of the foam core 81, and has at its inner surface a plurality of concave cavities 820 each matedly surrounding a respective one of the bulging, outermost beads 811 on the outer surface of the foam core 8. The foam skin 82 and the foam core 81 are firmly bonded together due to the inter-engaged convex and concave surfaces therebetween. Besides, it should be noted that the foam skin 82 and the foam core 81 may be directly heat bonded to each other with similar materials. Alternatively, an adhesive may be employed in between the foam skin 82 and the foam core 81 to further enhance the bonding between the two. In contrast, the outer surface of the foam skin 82 is relatively more flat than the inner surface of the foam skin 82 and is bonded with the non-foam plastic film 83.

As described above, the expanded beads of the foam core 81 may comprise a material of expanded polyolefin, expanded polystyrene or copolymers. The foam skin 82 may comprise a material of expanded polyethylene or expanded polypropylene with a thickness of about 2 mm. The non-foam plastic film 83 may be made of a wear-resistant material, such as polyethylene (PE) or a Surlyn® resin, with a thickness of about 0.03 to 0.3 mm. As is known in the art, the Surlyn® resin is a copolymer of ethylene and methacrylic acid manufactured by DuPont, and generally has better wear resistance than the polyethylene.

Figure 24A:
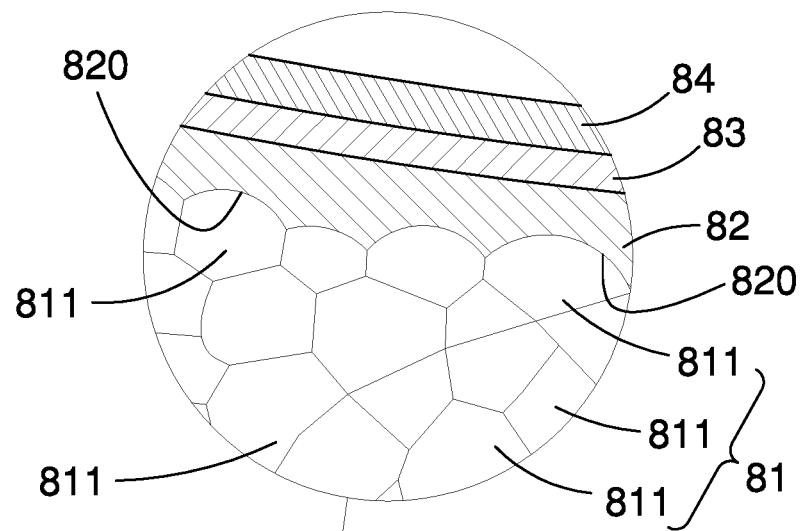
FIG. 24A is a partial enlarged view of the foam product shown in FIG. 24.
Figure 24:
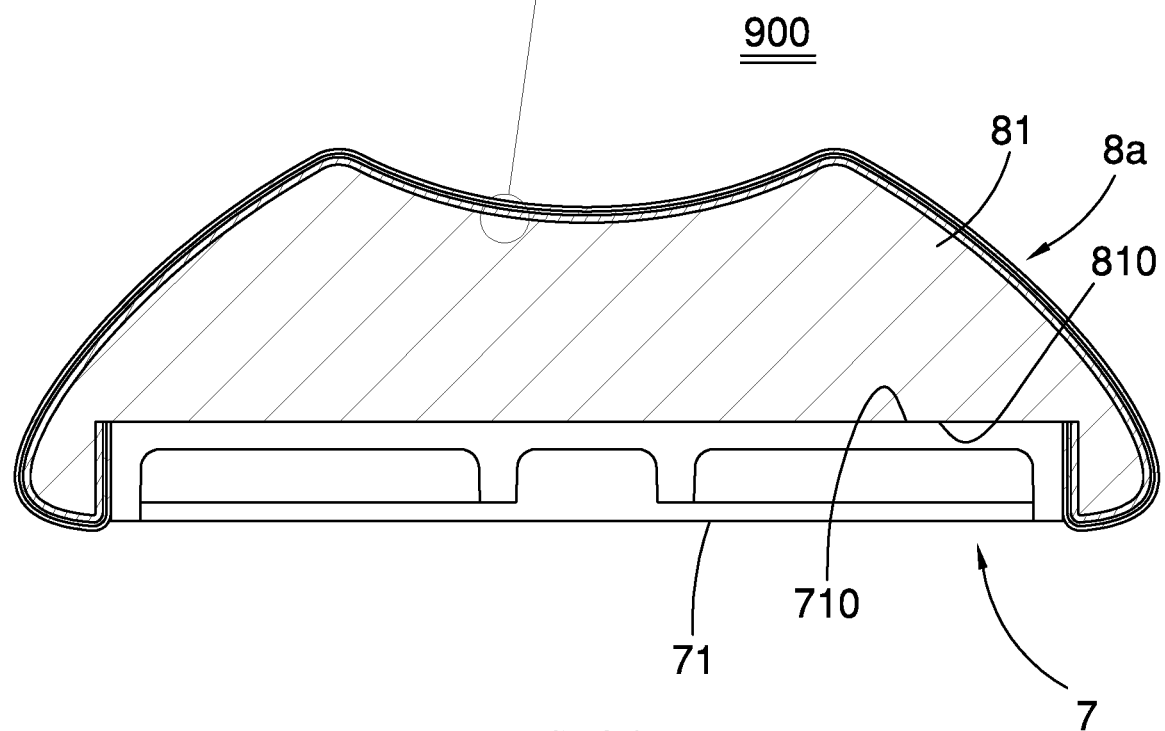
FIG. 24 is a cross-sectional view of a foam product in accordance with a ninth embodiment of the present invention.

Referring to FIGS. 24 and 24A, there is shown a ninth embodiment of the foam product 900 according to the invention. The foam product 900 of the ninth embodiment is generally identical to the foam product 800 of the eighth embodiment, except that the saddle cushion 8*a* is slightly different from the saddle cushion 8 shown in FIG. 23. That is to say, a second, non-foam plastic film 84 is further employed on an outer surface of the first non-foam plastic film 83. And, the second non-foam plastic film 84 is more wear-resistant than the first non-foam plastic film 83. In this embodiment, the first non-foam plastic film 83 is made of ethylene, and the second non-foam plastic film 84 is made of the Surlyn® resin with a thickness of about 0.6 mm.

It should be evident that this disclosure is by way of example and that various changes may be made by adding, modifying or eliminating details without departing from the fair scope of the teaching contained in this disclosure.

What is claimed is:

1. A foam product comprising:
   a foam core defining in its top surface a recess, the recess having an inner wall;
   a soft shell disposed within the recess of the foam core and having an outer wall attached to the inner wall of the recess, wherein the soft shell has a space configured in size to receive at least one finger of a human hand; and
   an upper foam skin with a bottom surface bonded to the top surface of the foam core, wherein the upper foam skin defining a first hole aligned with an opening of the space of the soft shell.

2. The foam product as recited in claim 1, wherein the soft shell is made of a cross-linked polyethylene foam.

3. The foam product as recited in claim 2, wherein the cross-linked polyethylene foam is an irradiated cross-linked polyethylene foam.

4. The foam product as recited in claim 1, wherein the soft shell has a thickness of 2 mm to 3 mm.

5. The foam product as recited in claim 1, wherein the space of the soft shell has an upper space and a lower, enlarged space to permit bending of the finger.

6. The foam product as recited in claim 1, wherein the soft shell includes a shell body and a pair of extensions extending from opposite sides of the shell body, each of the extensions has two sheets attached to each other, and the recess of the foam core is sized and shaped to receive the soft shell.

7. The foam product as recited in claim 1, wherein the soft shell includes a shell body and a flange extending from a top edge of the shell body, and the recess of the foam core is sized and shaped to receive the soft shell.

8. The foam product as recited in claim 1, wherein the foam core includes a first foam body and a second foam body disposed in the first foam body; the second foam body is more rigid than the first foam body; and the recess is defined in the second foam body of the foam core.

9. The foam product as recited in claim 8, wherein the first foam body of the foam core comprises expanded polystyrene, and the second foam body of the foam core comprises a copolymer of expanded polystyrene and expanded polyethylene.

10. The foam product as recited in claim 1, further comprising a non-foam plastic film with a bottom surface bonded to a top surface of the upper foam skin, wherein the non-foam plastic film defining a second hole aligned with the first hole of the upper foam skin.

11. The foam product as recited in claim 1, further comprising a lower foam skin with a top surface bonded to a bottom surface of the foam core, and a non-foam plastic plate with a top surface bonded to a bottom surface of the lower foam skin.

12. The foam product as recited in claim 1, further comprising a foam skin with a surface bonded to a surface of the foam core, the foam core including a tightly packed cluster of expanded beads, wherein some outermost beads of the expanded beads are exposed and protruded on the surface of the foam core, and the foam skin has at its surface a plurality of cavities sized and shaped to respectively receive the protruded, outermost beads on the surface of the foam core.

13. A foam product comprising:
   a foam core defining in its top surface a recess, the recess having an inner wall;
   a soft shell disposed within the recess of the foam core and having an outer wall attached to the inner wall of the recess, wherein the soft shell has a space configured in size to receive at least one finger of a human hand,
   wherein the foam core includes a first foam body and a second foam body disposed in the first foam body; the second foam body is more rigid than the first foam body; and the recess is defined in the second foam body of the foam core.

14. The foam product as recited in claim 13, wherein the space of the soft shell has an upper space and a lower, enlarged space to permit bending of the finger.

15. The foam product as recited in claim 13, wherein the soft shell includes a shell body and a pair of extensions extending from opposite sides of the shell body, each of the extensions has two sheets attached to each other, and the recess of the foam core is sized and shaped to receive the soft shell.

16. The foam product as recited in claim 13, wherein the soft shell is made of an irradiated cross-linked polyethylene foam.

17. A foam product comprising:
   a foam core defining in its top surface a recess, the recess having an inner wall;
   a soft shell disposed within the recess of the foam core and having an outer wall attached to the inner wall of the recess, wherein the soft shell has a space configured in size to receive at least one finger of a human hand,
   wherein the space of the soft shell has an upper space and a lower, enlarged space to permit bending of the finger.

18. The foam product as recited in claim 17, wherein the soft shell is made of an irradiated cross-linked polyethylene foam.

* * * * *